US007443928B2

(12) United States Patent  (10) Patent No.: US 7,443,928 B2
Nefedov et al.  (45) Date of Patent: Oct. 28, 2008

(54) SIGNAL DETECTION USING SPHERE DECODING TECHNIQUE

(75) Inventors: Nikolai Nefedov, Espoo (FI); Manuel Enrique Ramirez Montalvo, Oulu (FI); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 591 days.

(21) Appl. No.: 10/860,327

(22) Filed: Jun. 4, 2004

(65) Prior Publication Data

US 2005/0175122 A1    Aug. 11, 2005

(30) Foreign Application Priority Data

Feb. 9, 2004    (FI)    .................... 20040196

(51) Int. Cl.
*H03K 9/10*    (2006.01)
(52) U.S. Cl. .................................... 375/323
(58) Field of Classification Search ............. 375/261, 375/268, 269, 272, 273, 279, 323, 329, 334, 375/353
See application file for complete search history.

(56) References Cited

U.S. PATENT DOCUMENTS

2003/0076890 A1 *  4/2003  Hochwald et al. ........... 375/264

FOREIGN PATENT DOCUMENTS

EP    1 363 405 A1    11/2003

OTHER PUBLICATIONS

Baldur Steingrimsson, et al., "Quasi-ML Detectors with Soft Output and Low Complexity for PSK Modulated MIMO Channels", IEEE, Signal Processing Advances in Wireless Communications, Jun. 15-18, 2003, pp. 427-431.
Mohamed Oussama Damen, et al., "On Maximum-Likelihood Detection and the Search for the Closet Lattice Point", IEEE, Transactions on Information Theory, Oct. 2003, vol. 49, No. 10, pp. 2389-2402.
IEEE, 2000, Electronics Letters Online No. 2000191, DOI: 10.1049/el:20000191, Jan. 20, 2000, vol. 36, No. 2, pp. 166-167.
A New Reduced-Complexity Sphere Decoder For Multiple Antenna Systems, Albert M. Chan, Inkyu Lee, IEEE 2002, 0-7803-7400-2/02, pp. 460-464.
Lattice Basis Reduction: Improved Practical Algorithms and Solving Subset Sum Problems, C.P. Schnorr, M. Euchner, Universität Frankfurt, Fachbereich Mathematik/Informatik, Jul. 1993.
IEEE Transactions on Information Theory, vol. 45, No. 5, Jul. 1999, 0018-9448/99, pp. 1639-1642.

(Continued)

*Primary Examiner*—Sam K Ahn
(74) *Attorney, Agent, or Firm*—Squire, Sanders & Dempsey L.L.P.

(57) ABSTRACT

Method and apparatus for detecting a signal are disclosed, wherein first set of symbols represents a signal received in a receiver. A second set of symbols is estimated, representing the signal transmitted at a transmitter using a sphere decoding technique. The estimation may employ at least two modulation schemes. Reliability information relating to bits forming a symbol may be determined for at least one symbol of the second set. Furthermore, reliability information relating to the signal may be taken into account in estimating at least one symbol of the second set.

55 Claims, 15 Drawing Sheets

OTHER PUBLICATIONS

Iterative Detection of MIMO Transmission Using a List-Sequential (LISS) Detector, Stephan Bäro, Joachim Hagenauer, Melanie Witzke, Institute for Communications Engineering, TU München, Germany, 0-7803-7802-4/03, IEEE, 2003, pp. 2653-2657.

Lattice Code Decoder for Space-Time Codes, Oussama Damen, Ammar Chkeif, and Jean-Claude Belfiore, 1089-7798/00, IEEE, 2000, pp. 161-163.

Achieving Near-Capacity on a Multiple-Antenna Channel, Bertrand M. Hochwald and Stephan ten Brink, IEEE Transacctions on Communications, vol. 51, No. 3, Mar. 2003, 00090-6778/03, IEEE 2003, pp. 389-399.

Damen, M. O. et al., "On Maximum-Likelihood Detection and the Search for the Closest Lattice Point", IEEE, Transactions on Information Theory, vol. 49, No. 10, Oct. 2003, pp. 2389-2402.

Steingrimsson, B. et al., "Quasi-ML Detectors with Soft Output and Low Complexity for PSK Modulated MIMO Channels", IEEE, Workshop on Signal Processing Advances in Wireless Communications, SPAWC, Jun. 15-18, 2003, pp. 427-431.

* cited by examiner

SIGNAL DETECTION USING SPHERE DECODING TECHNIQUE

BACKGROUND OF THE INVENTION

1. Field of the Invention

The present invention relates in general to signal detection. In particular the present invention relates to signal detection using sphere decoding techniques.

2. Description of the Related Art

Recently in the area of communications systems, multiple input multiple output (MIMO) technology has gained a lot of attention in the research community. An important and interesting research area of MIMO systems, and also in connection with other systems, is the detection of the received signals.

Detection of received signals refers to determining which signals were sent based on received signal. Using a vector notation, where in the case of a MIMO system each vector component $x_i$ of a sent signal x represents a signal (symbol) sent from one MIMO antenna, the aim in signal decoding is to determine a sent signal x based on and channel knowledge and a received signal r. A symbol $x_i$ needs to be a valid symbol of the modulation scheme used in the transmission. In principle, the modulation scheme symbol appearing due to channel distortions to be nearest to the received symbol $r_i$ is determined to be the sent symbol $x_i$. Calculation of distances to all possible symbols is an extremely complicated task, so in practice the nearest symbol within a certain search area is selected as the sent symbol $x_i$. The difficulty is to find this modulation scheme symbol nearest to the received symbol $r_i$, or candidates for this nearest symbol, in an efficient way.

Different algorithms have been proposed, discussed and tested for signal detection. One of these signal detection algorithms is called a Sphere Decoder, and it has been proposed by E. Viterbo and J. Boutros, in "A Universal Lattice Code Decoder for Fading Channels", *IEEE Transactions on Information Theory*, Vol. 45, No. 5, July 1999, pp. 1639-1642. The Sphere Decoder is originally presented for decoding a coded signal, but it is applicable also in signal detection. A sphere decoder is a sub-optimal maximum likelihood method with the advantage of low complexity. In the sphere coding, the signal components $x_i$ are determined one by one by searching a nearest valid modulation scheme symbol for a received symbol $r_i$ within a search area.

The basic idea in a Sphere Decoder is to process vectors and matrices representing the received symbols and channel knowledge so that interference between the sent symbols $x_1$, $x_2, \ldots, x_N$ caused by a channel is taken into account and at the same time it is possible to determine a first symbol $x_N$ independently of the other symbols. Using the first determined symbol $x_N$ it is possible to determine symbol $x_{N-1}$ and so on, resulting in a vector x containing symbols $x_i$. The first determined symbol is denoted here with the index N, because the calculations in a Sphere Decoder typically involve upper-triangular matrices.

When information is transmitted and distorted in a noisy channel, the data becomes fuzzy and any decision made in the receiver side may lead to errors and lost of information. Soft detection has the target of keeping some reliability information on a detected symbol and making a "hard" decision as late as possible in the receiver. The known sphere decoders are designed as a "hard" output detector, returning as the sent signal x the vector of constellation symbols with the shortest Euclidean distance to the received signal r. Furthermore, it is possible that there is available some a priori information relating to the sent signal. This a priori information could enhance the accuracy of determining the sent signal x.

In many communication systems there are defined a number of modulation schemes, which can be used. The modulation scheme in use may vary from user to user, depending for example on the transmission rate relating to each user. Current sphere detection methods are not able to decode signals relating to different modulation schemes simultaneously.

There is thus a need for more versatile signal detection methods. The aim of the embodiments of this invention is to provide signal detection using sphere decoding for various purposes.

It is appreciated that although problems relating to signal detection using sphere decoding have been discussed in connection with MIMO systems, they may be relevant also in other communications systems.

SUMMARY OF THE INVENTION

A first aspect of the present invention relates to a method for detecting a signal, said method comprising
    receiving a first set of symbols representing a signal received in a receiver, and
    estimating a second set of symbols representing said signal transmitted at a transmitter using a sphere decoding technique, wherein the estimation employs at least two modulation schemes.

A second aspect of the present invention relates to a method for detecting a signal, said method comprising
    receiving a first set of symbols representing a signal received at a receiver,
    estimating a second set of symbols representing said signal transmitted at a transmitter using a sphere decoding technique, and
    determining reliability information relating to bits forming a symbol for at least one symbol of said second set.

A third aspect of the present invention relates to a method for detecting a signal, said method comprising
    receiving a first set of symbols representing a signal received at a receiver, and
    estimating a second set of symbols representing said signal transmitted at a transmitter using a sphere decoding technique, wherein reliability information relating to said signal is taken into account in estimating at least one symbol of the second set.

A fourth aspect of the present invention relates to an apparatus for detecting a signal, said apparatus configured to
    receive a first set of symbols representing a signal received at a receiver antenna, and
    estimate a second set of symbols representing said signal transmitted at a transmitter using a sphere decoding technique, wherein the estimation employs at least two modulation schemes.

A fifth aspect of the present invention relates to an apparatus for detecting a signal, said apparatus configured to
    receive a first set of symbols representing a signal received at a receiver antenna, and
    estimate a second set of symbols representing said signal transmitted at a transmitter using a sphere decoding technique, and
    determine reliability information relating to bits forming a symbol for at least one symbol of said second set.

A sixth aspect of the present invention relates to an apparatus for detecting a signal, said apparatus configured to
    receive a first set of symbols representing a signal received at a receiver antenna, and estimate a second set of symbols representing said signal transmitted at a transmitter using a sphere decoding technique, wherein reliability information relating to said signal is taken into account in estimating at least one symbol of the second set.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

In the following description, reference is often made to a multiple-input-multiple-output (MIMO) system. The present invention is, however, not limited to decoding signals of a MIMO system. Other systems, where the present invention may be applicable, are discussed below.

In the following description, reference is made to a Sphere Decoder for keeping the naming in line with the original Sphere Decoder. It is appreciated, however, that signal detection using a Sphere Decoder concentrates on signal detection and does not imply the presence of any coding in the received signal.

The information carried by the received signal may be coded or it may be uncoded.

Figure 1:
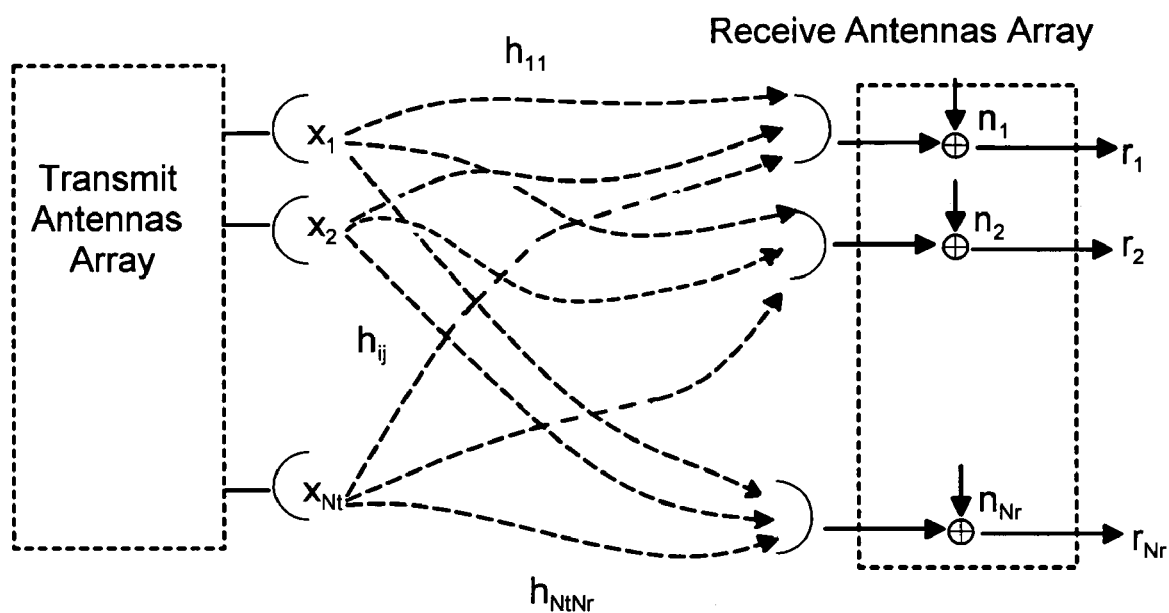
FIG. 1 shows schematically a MIMO communication system with which embodiments of the invention can be used.

FIG. 1 shows schematically a MIMO communications system as an example of a communications system where embodiments of the invention can be used. The MIMO communications system in FIG. 1 contains a transmit antenna array containing $N_t$ transmit antennas and a receive antenna array containing $N_r$ receive antennas. In the following, the symmetry constraint $N_t=N_r$ is considered. The vector transmitted during each time period is denoted as $x=[x_1, x_2, \ldots, x_N]$, where each component is an independent choice, as an example, from a complex M-QAM (Quadrature Amplitude Modulation) constellation. The transmitted signal is created as $x=vL$, where L is the lattice generator matrix with basis $\{m_1, m_2, \ldots, m_n\}$, and $v=\{v_1, v_2, \ldots, v_{N_t}\}$ is the integer component vector to which the information bits are mapped.

The received signal is represented by $r=Hx+n$, where the matrix H is a channel matrix and n represents noise. In connection with the MIMO system, a channel matrix H represents channels of a multiple-input-multiple-output system and $x_i$ represents a symbol transmitted by one of the antennas of the multiple-input-multiple-output system. In connection with a time division system, matrix H represents multiple paths from a transmitter antenna to a receiver antenna and $x_i$'s represent sequential symbols of a user of the time division system. In connection with a code division system, matrix H represents different codes of a code division system or any block transmission matrix, and $x_i$ represents a signal relating to one of the different codes.

It is appreciated that in general, the sphere decoding may be used for signal detection in presence of interference where interference may come form arbitrary source as in the examples above.

Figure 2:
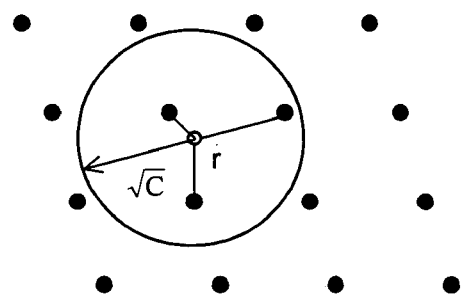
FIG. 2 shows graphically the concept of a Sphere Decoder for signal detection.

The goal of the Sphere Decoder detector is to look for valid points of the constellation (lattice $\Lambda$) inside a sphere or radius $\sqrt{C}$, centered at the received point in terms of the metric $$m(\hat{x} \mid r, H) = \sum_{i=1}^{n} |r_i - h_i x_i|^2 \qquad \text{(Eq. 1)}$$

where $r=Hx+n$ is the received vector, and the lattice $\Lambda$ is the result of a linear transformation defined by matrix $L:R^{N_t} \to R^{N_t}$, when applied to the cubic lattice $Z^{N_t}$. This concept can be observed graphically in FIG. 2.

For signal decoding, the problem to solve, therefore, is to find the shortest distance $\|r-x\|^2$ in the "translated" lattice $r-\Lambda$, such that $$\min_{x \in \Lambda} \|r-x\|^2 = \min_{w \in r-\Lambda} \|w\|^2 \qquad \text{(Eq. 2)}$$

where w is defined as $w=\xi L, \xi_i=\rho_i-v_i$ with $\xi=(\xi_1, \ldots, \xi_{N_t}) \in R^{N_t}$, and $r=\rho L$ with $\rho=(\rho_1, \ldots, \rho_{N_t}) \in R^{N_t}$ noticing that $\rho$ and $\xi$ are real vectors. It is observed that $$w = \sum_{i=1}^{N_t} \xi_i m_i,$$

where $\xi_i = \rho_i - v_i$, $i=1, \ldots, N_t$, defines translated coordinate axes.

With this translation of axis the sphere is transformed into an ellipsoid centered at the origin of the new coordinate system defined by $\xi$, and $$\|w\|^2 = \xi HH^T \xi^T \leq C \quad \text{(Eq. 3)}$$

Using, for example, Cholesky Factorization the channel matrix H is decomposed into a new upper diagonal matrix U, such that $U^T U = HH^T$, and Equation 3 can be rewritten as $$\xi U^T U \xi^T = \|U \xi^T\| = \sum_{i=1}^{N_t} \left( u_{ii} \xi_i + \sum_{j=i+1}^{N_t} u_{ij} \xi_j \right)^2 \leq C \quad \text{(Eq. 4)}$$

which, after substituting $q_{ii} = u_{ii}^2$ and $q_{ij} = u_{ij}/u_{ii}$, becomes $$\sum_{i=1}^{N_t} q_{ii} \left( \xi_i + \sum_{j=i+1}^{N_t} q_{ij} \xi_j \right)^2 \leq C \quad \text{(Eq. 5)}$$

Applying the algorithm described in the article by Boutros and Viterbo mentioned above, it is possible to use the $i = N_t$ received point to find the $N_t - 1$ and so on, obtaining the equations for the upper and lower bounds of the $\hat{x}_i$ term as $$LB_i \leq \hat{x}_i \leq UB_i \quad \text{(Eq. 6)}$$

where $$UB_i = \left\lfloor \sqrt{\frac{1}{q_{ii}}(T_i)} + S_i \right\rfloor \quad \text{(Eq. 7)}$$

and $$LB_i = \left\lceil -\sqrt{\frac{1}{q_{ii}}(T_i)} + S_i \right\rceil \quad \text{(Eq. 8)}$$

During the iterations the bounds defined by Equations 7 and 8 are updated recursively with the use of equations $$S_i = S_i(\xi_{i+1}, \ldots, \xi_{N_t}) = \rho_i + \sum_{j=i+1}^{N_t} q_{ii} \xi_j \quad \text{(Eq. 9)}$$

and $$T_{i-1} = T_{i-1}(\xi_{i+1}, \ldots, \xi_{N_t}) \quad \text{(Eq. 10)}$$
$$= C - \sum_{k=i+1}^{N_t} q_{kk} \left( \bar{\xi}_k + \sum_{p=k+1}^{N_t} q_{kp} \xi_p \right)^2$$
$$= T_i - q_{ii}(S_i - \hat{x}_i)^2$$

While executing these iterations two things can happen:

a) The decoder arrives to $\hat{x}_i$ and chooses a value within the computed range. In this case, if the distance of the detected set of symbols from the received point, given by $$d^2 = T_1 + q_{11}(S_1 - \hat{x}_1)^2$$

is not bigger than C then the search is complete and the vector $\hat{x}$ is returned, otherwise the process should start again with a bigger sphere radius.

b) The decoder does not find a point in the constellation which lies between the upper and lower bounds for $\hat{x}_i$. Here, the decoder should go back to $\hat{x}_{i-1}$, use a different candidate of $\hat{x}_{i-1}$ within the upper and lower bounds, and try again for $\hat{x}_i$. If $\hat{x}_{i-1}$ has no more candidates the decoder goes back to $\hat{x}_{i-2}$ and so on.

It is appreciated that although above reference is made to determining symbols $\hat{x}_i$ one by one, it may be possible to determine the symbols in groups by using different matrix manipulation techniques.

The Sphere decoder algorithm may be modified to reduce the complexity during the search for the best point inside the sphere. The original sphere decoder starts the search in the surface of the sphere and zigzags towards the center looking for the closest lattice point to the received one. In contrast, the reduced complexity algorithm proposed by C. P. Schnorr and M. Euchner, in "Lattice basis reduction: improved practical algorithms and solving subset sum problems", *Mathematical Programming*, Vol. 66, 1994, pp. 181-191, proposes to start the search from the center of the sphere and move outwards. Once a valid lattice point is found inside the sphere, its radius is decreased to the distance of the newly discovered lattice point from the center and the search moves to the next point. Also A. M. Chan and I. Lee discuss a reduced sphere decoder in "A New Reduced-Complexity Sphere Decoder For Multiple Antenna Systems", *IEEE International conference on Communications ICC'02*, Vol. 1, No. 28, May 2002, pp. 460-464.

Figure 5:
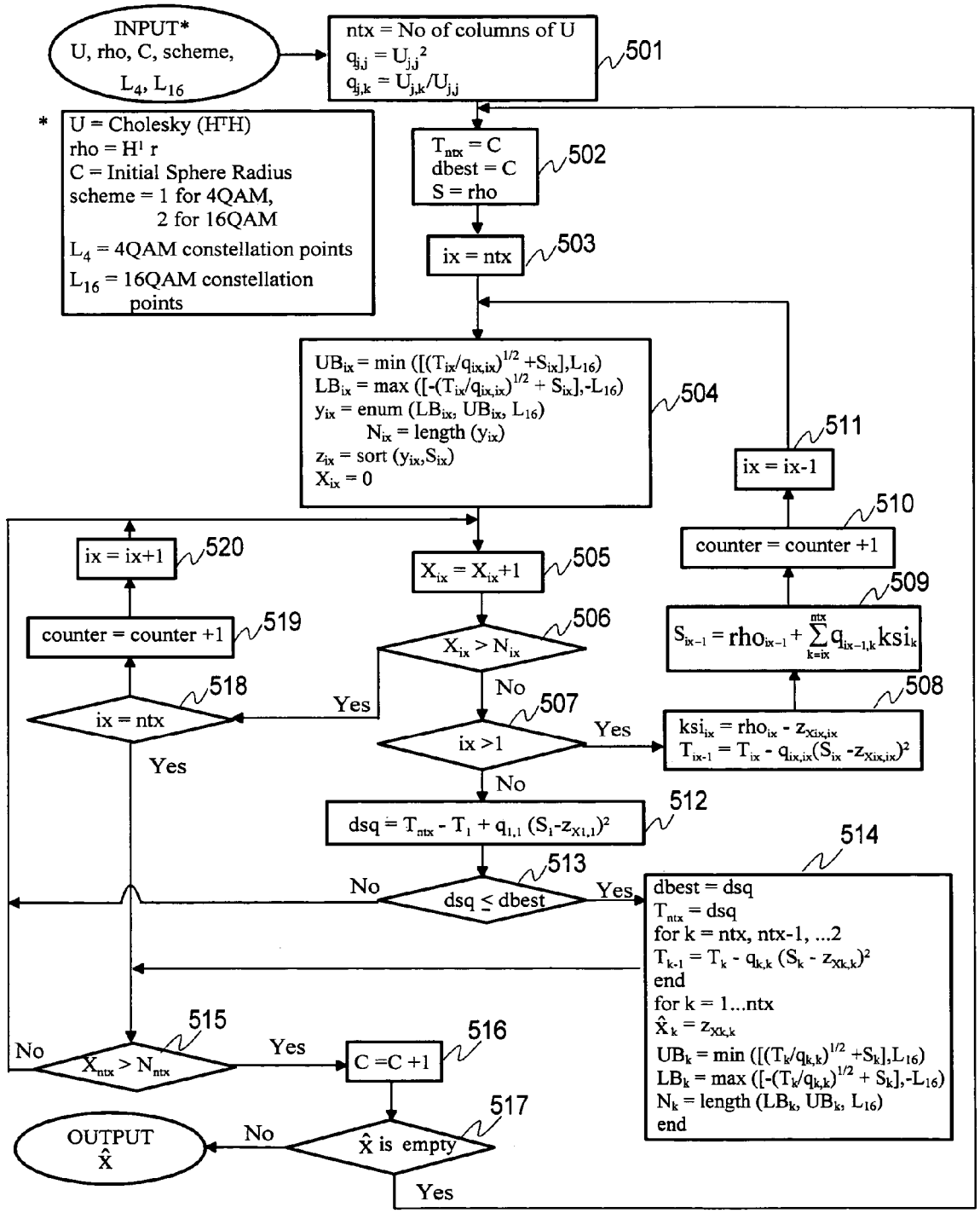
FIG. 5 shows, as an example, a flowchart of a Mixed 4-QAM/16-QAM Sphere Decoder for signal detection in accordance with the first embodiment of the invention.

By starting from the center of the sphere, the sphere decoder can be expected to find the closest symbol in less number of operations than when starting from the boundary. Two main additions to the original sphere decoder have to be considered in order to reduce its complexity. First, for each lower and upper bound of the $i^{th}$ coordinate the candidate symbols of $\hat{x}$ within them are sorted in an ascending order according to the metric $|y_{ij} - S_i|^2$ and stored in a vector $z_i$. Here $y_i$ is a vector with elements $[y_{i,1}, y_{i,2}, \ldots]$, containing all the constellation points between $LB_i$ and $UB_i$. This forces the algorithm to search the coordinates closest to the middle of the interval defined by the bounds rather than search the coordinates near the lower bound first. Secondly, every time a lattice point $\hat{x}$ is found within the sphere, the vector T in Equation 10 and all the lower and upper bounds in Equations 7 and 8 are updated. These updates eliminate some of the candidate coordinates at the rightmost ends of the $z_i$ vector by reducing the length of the possible symbols. As shown in FIG. 5, the vector $z_i$ contains sorted components of vectors $y_i$ and vector $\rho$, which is the received signal with the channel inverted. The rest of the algorithm remains unchanged, and the iterations continue until a set of symbols is stored in $\hat{x}$. Embodiments of the present invention may use the reduced complexity sphere decoder concept.

Figure 3A:
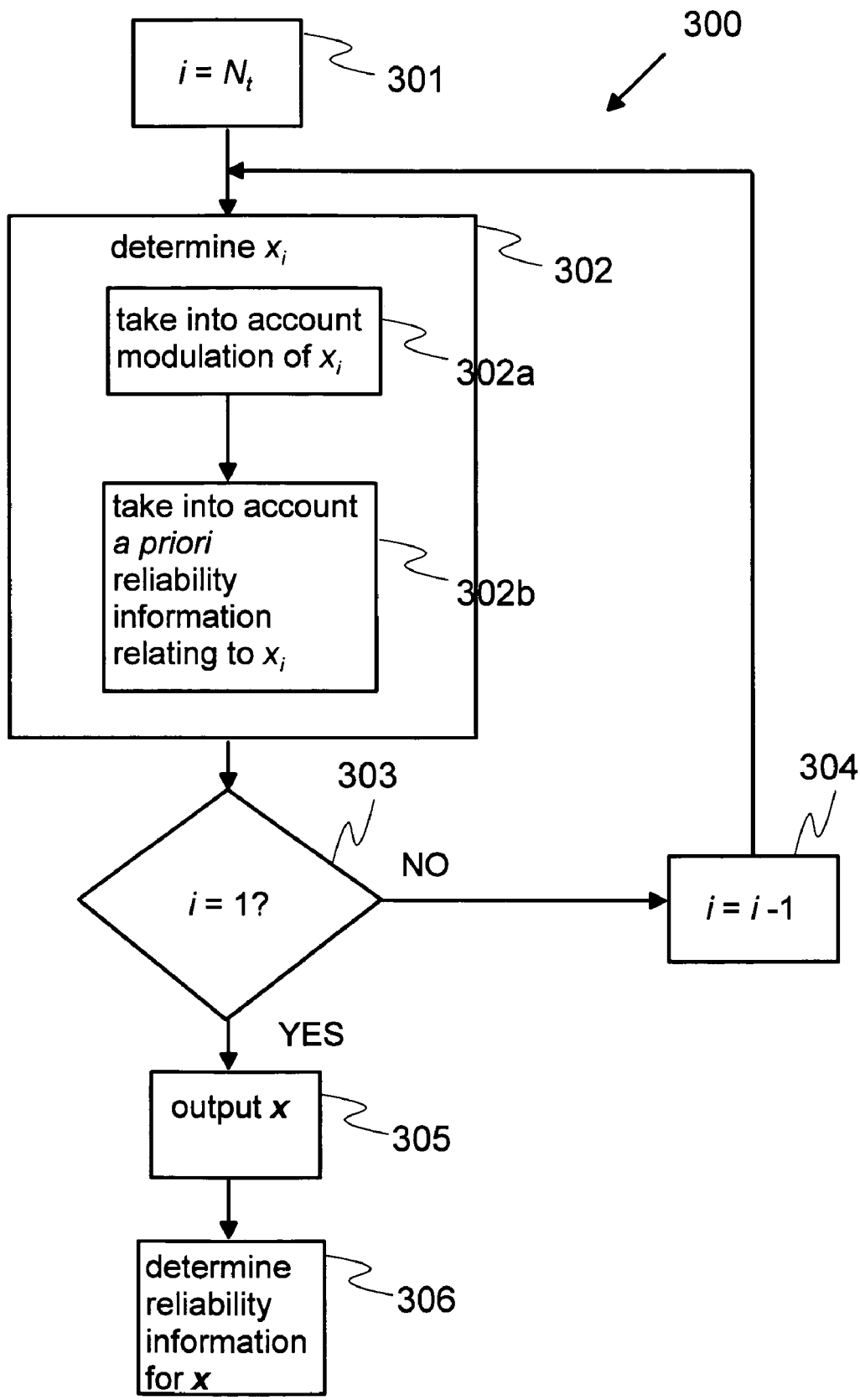
FIG. 3A shows a simplified flowchart of a Sphere Decoder for signal detection in accordance with an embodiment of the invention.

FIG. 3A shows a simplified flowchart of a Sphere Decoder signal detection method 300 in accordance with an embodiment of the invention. For simplicity, a symmetric case, where the number of transmitter and receiver antennas is equal to $N_t$. Furthermore, the sent and received signals are assumed to have real values and only the main features of determining iteratively sent symbols $x_i$ are shown. In step 301, a counter i is initialised to value $N_t$. A symbol $x_i$ is determined in step 302, in a way discussed above, using for example the relevant steps of the reduced complexity Sphere Decoder or steps of the original Sphere Decoder. Step 302 contains two sub-steps. In step 302a, the modulation of the sent symbol $x_i$ is taken into account in determining the symbol $x_i$. In step 302b, a priori information is taken into account in determining the sent symbol $x_i$. After the symbol $x_i$ has been determined, the value of the counter is checked in step 303. If all symbols $x_i$ have not been determined, the counter value is decreased in step 304 and the method proceeds to determine the next symbol $x_{i-1}$. If all symbols $x_i$ have been determined, the vector x is output in step 305. In step 306, reliability information relating to bits forming symbols is determined for the vector x.

In FIG. 3A, step 302a allows detection of symbols $x_i$ of different modulation schemes. The modulation scheme of $x_j$ typically affects the search area for symbol $x_i$. Step 302b allows taking into account soft a priori information. This a priori information is typically used in weighting the candidate symbols within the search area. The a priori information pertaining to at least some information bits or symbols may be any reliability information relating to the sent or received signal. It may be obtained, for example, from a channel decoder or an error detector following a Sphere Decoder Detector or from previously detected symbols within the Sphere Decoder detector. Other examples include a priori information coming from any external source, such as the channel decoder or error detector of other information streams belonging to another user or service.

The vector x in step 305 is typically a hard output in that sense that although soft a priori information may have been used in step 302, the output contains only a set of symbols $x_i$. Step 306, in turn, reliability information relating to bits forming symbols is determined at least for one symbol, but typically for all symbols $x_i$. This reliability information relating to bits forming symbols may be used for calculating soft information for symbols, if needed.

It is appreciated that an alternative to the flowchart shown in FIG. 3A is to have the step 306 inside step 302. This means that a soft value for symbol $x_i$ is determined before determining the next symbol $x_{i-1}$. In this case the mathematic operations relating to steps 302b and 306 are typically carried out together.

Figure 3B:
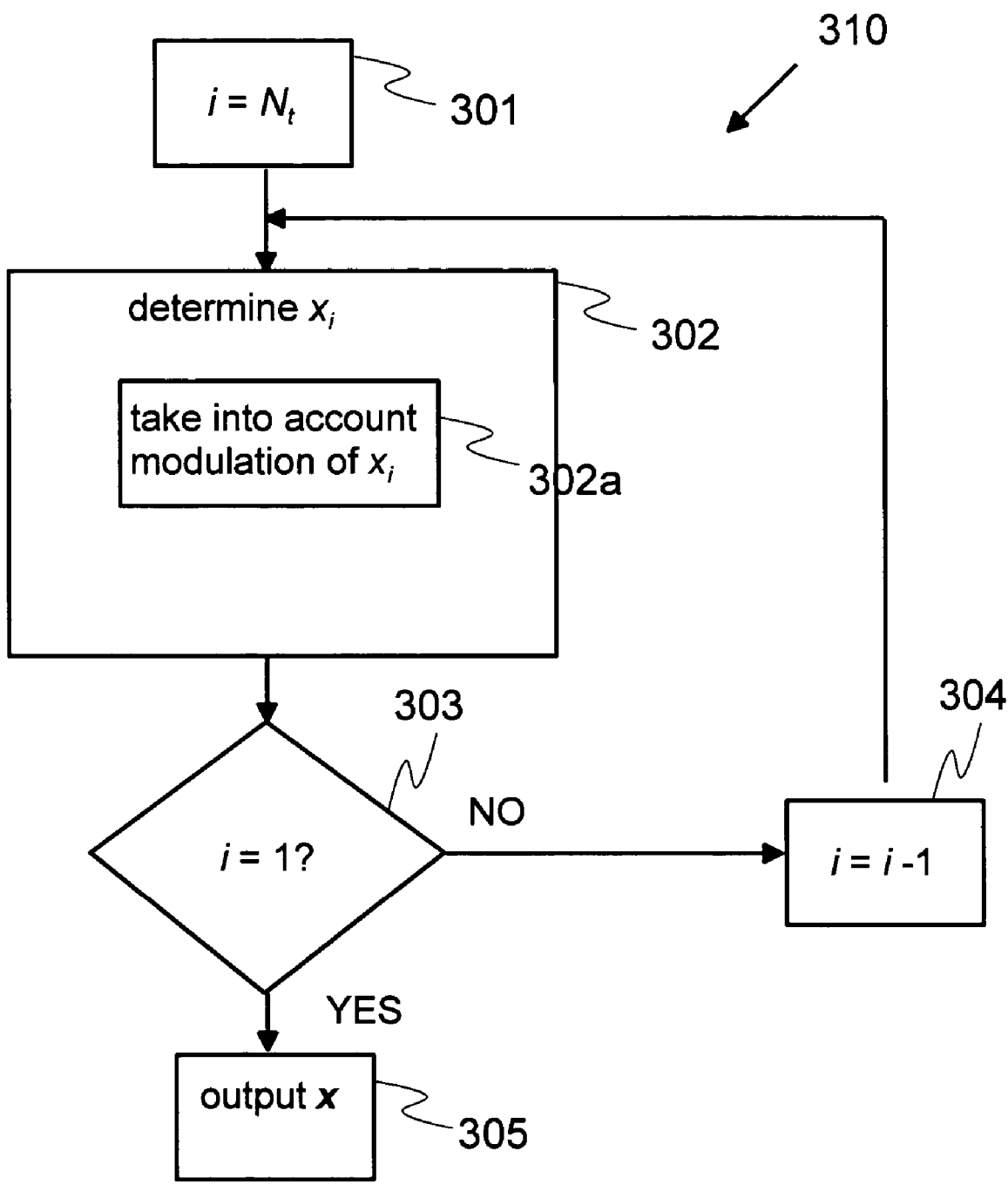
FIG. 3B shows a simplified flowchart of a Sphere Decoder for signal detection in accordance with a first embodiment of the invention.
Figure 3C:
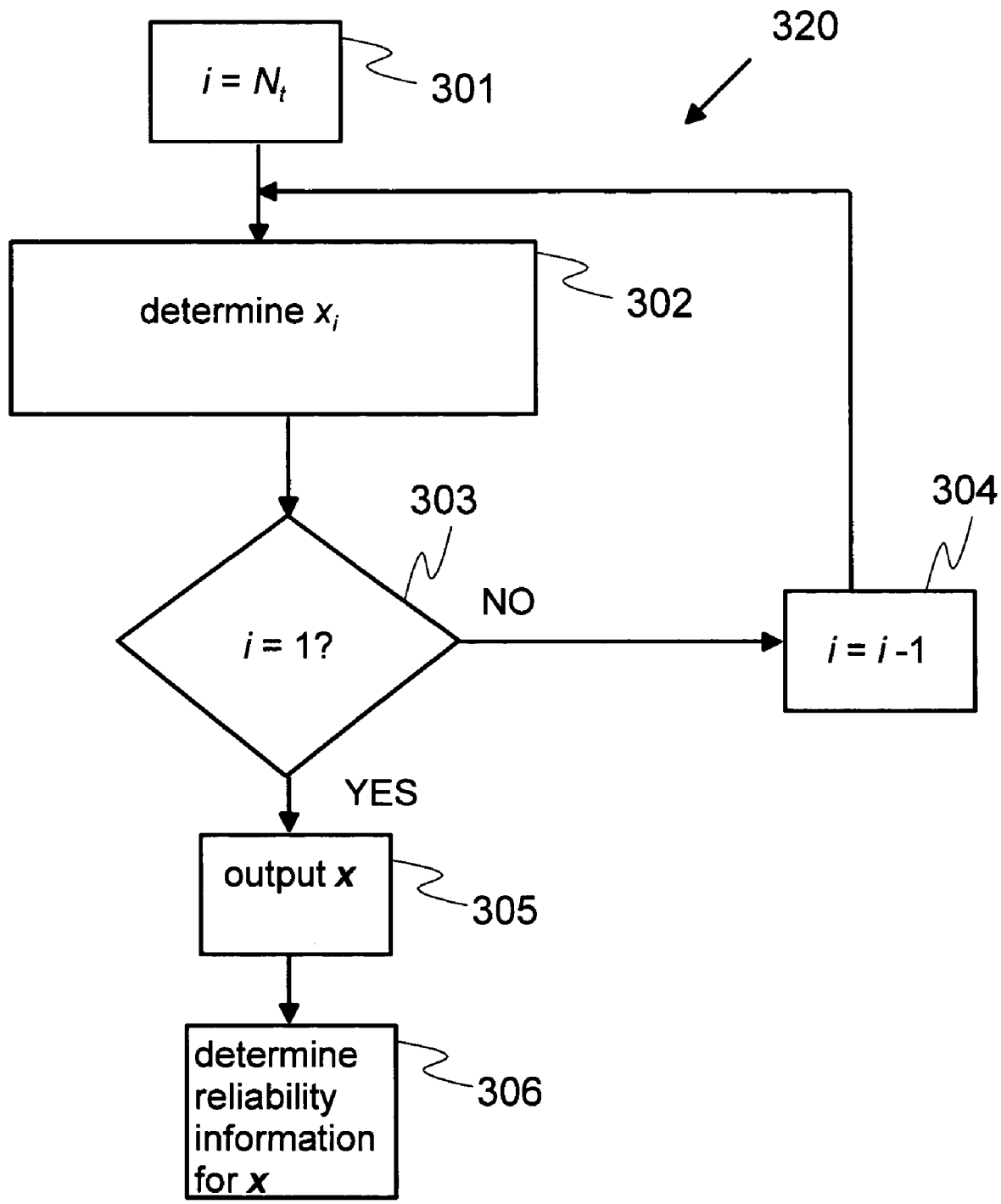
FIG. 3C shows a simplified flowchart of a Sphere Decoder for signal detection in accordance with a second embodiment of the invention.
Figure 3D:
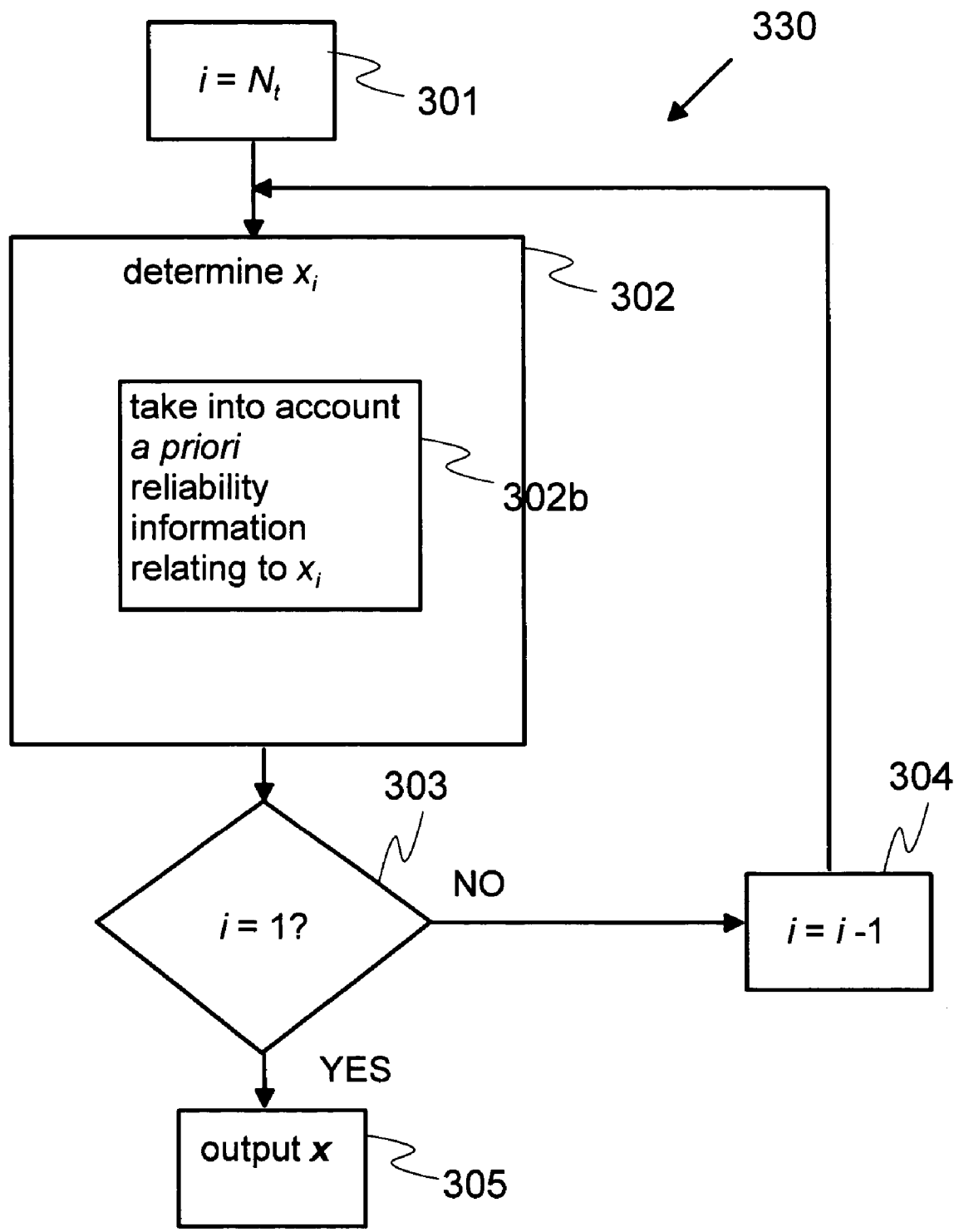
FIG. 3D shows a simplified flowchart of a Sphere Decoder for signal detection in accordance with a third embodiment of the invention.

It is possible that only one of steps 302a, 302b and 306 is present in method 300. This examples are illustrates in FIGS. 3B, 3C and 3D, which show flowcharts for methods 310, 320 and 330. Alternatively any two of these steps may be present. Furthermore, as FIG. 3A shows, all steps 302a, 302b and 306 may be present in method 300.

In the following three embodiments of the invention are discussed in more detail. A first embodiment of the invention relates to detecting symbols of different modulation schemes simultaneously. A Sphere Decoder for signal detection in accordance with the first embodiment is here called a Mixed Sphere Decoder for signal detection. A second embodiment of the invention relates to obtaining soft values in the output of a Sphere Decoder. A Sphere Decoder for signal detection in accordance with the second embodiment is here called a Soft Output Sphere Decoder for signal detection. A third embodiment of the invention is directed to receiving soft additional a priori information, typically in form of probabilities. A Sphere Decoder for signal detection in accordance with the third embodiment is here called a Soft Additional Input Sphere Decoder for signal detection.

Figure 4:
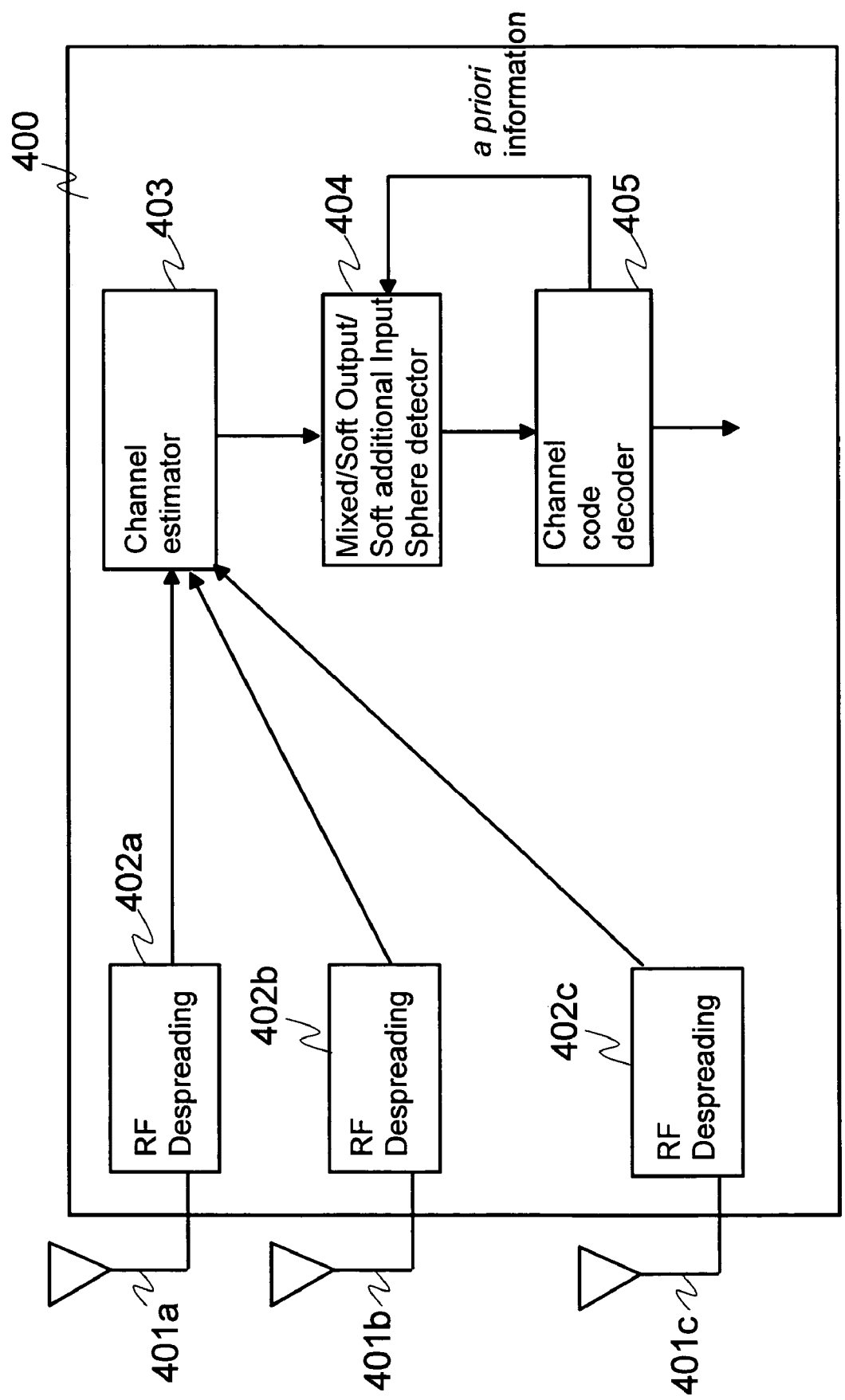
FIG. 4 shows schematically a Sphere Decoder and an apparatus for signal detection in accordance with an embodiment of the invention.

FIG. 4 shows schematically a Sphere Decoder 404 for signal detection and a device 400 in accordance with an embodiment of the invention. The device 400 contains, as an example, a set of antennas 401a, 401b, and 401c. As an example, this device 400 relates to spread spectrum system. Each antenna 401 is connected to a RF/despreading unit 402. The RF/despreading units 402 are connected to a channel estimator 403, which is responsible for determining the channel matrix H and the received symbols r. From the channel estimator 403 information about the received symbols and about the channel properties is fed to the Sphere Decoder 404 for signal detection. The Sphere Decoder 404 for signal detection may be a Mixed Sphere Decoder, a Soft Additional Input Sphere Decoder, and/or a Soft Output Sphere Decoder. The output of the Sphere Decoder 404 is connected to a channel code decoder 405. As one example of a source of a priori information, FIG. 4 shows how information from the channel code decoder 405 is fed back to the Sphere Detector 404 for signal detection.

The Sphere Decoder 404 for signal detection may be implemented as suitable programming code for a programmable processor. Alternatively, the Sphere Decoder 400 may be implemented as hardware specially designed for sphere decoding.

The device 400 may be a portable communications device. It may be, for example, user equipment, a mobile telephone, a mobile station, a personal digital assistant, or a laptop computer. The device 400 may alternatively be a fixed device. Furthermore, the device 400 may be a network element for a communications network. It may be, for example, a transceiver network element for a cellular communications system.

It is appreciated that the RF part of a receiver is formed of the RF and despreading units 402. The base band part of a receiver is formed of the channel estimator 403, the signal detector 404 using a Sphere Decoder, and the channel code decoder 405. The base band part of a receiver need not contain a channel code decoder 405, but typically signals sent over a radio interface are channel coded.

The first embodiment of the invention relates to detecting symbols of different modulation schemes simultaneously. As an example, a Mixed Sphere Decoder with $N_t$ transmit antennas and $N_r = N_t$ receive antennas is considered, capable of detecting 4-QAM and 16-QAM symbols transmitted simultaneously in different antennas.

It is appreciated that although this specific example relates to detecting symbols sent using known different modulation schemes or modulation alphabets, it is possible that the receiver is not aware of the modulation scheme used for a symbol. The receiver may try to detect a symbol using a number of possible modulation alphabets and then select the correct modulation alphabet using some predefined criteria.

The known Sphere decoding algorithms are valid only for signal detection with real constellations. To employ sphere decoding for signal detection with complex constellations, the incoming vector r and the channel matrix H should be decomposed in real and imaginary parts prior to their use in the Sphere Decoder. These decompositions are shown in below:

$$r^{dagger} = \begin{bmatrix} \text{Real}(r) \\ \text{Imag}(r) \end{bmatrix} \text{ and } H^{dagger} = \begin{bmatrix} \text{Real}(H) & -\text{Imag}(H) \\ \text{Imag}(H) & \text{Real}(H) \end{bmatrix}.$$

$r^{dagger}$ and $H^{dagger}$ will be used in the description, omitting the symbol "dagger". The value $2N_t$ will be used also, to denote the length of $r^{dagger}$.

During the iterations of the Sphere Decoder the possible values that the symbol $\hat{x}_i$ can take are given by the boundaries imposed in Equation 6. These boundaries need to be forced to constellation values.

In the 4-QAM case the constellation can be described by a vector $L_{4QAM}=[-1,1]$, and hence, the choices for the $\hat{x}_i$ point are selected with the maximum or minimum between the bounds and the lattice points as $LB_i=\max(LB_i,-1)$ and $UB_i=\min(UB_i,1)$, where $UB_i$ and $LB_i$ are first calculated as in Equations 7 and 8.

In the second scheme considered, 16-QAM, the constellation may contain the values $L_{16QAM}=[-3, -1, 1, 3]$, making the situation more complicated candidate point lies now within any pair of adjacent constellation points. In order to obtain the correct boundaries a series of conditions testing each constellation point are necessary. This set of conditions are expressed in MATLAB code below, where $UB_i$ and $LB_i$ are initially computed as in Equations 7 and 8.

if($UB_i$>3) then $UB_i$=3
    elseif($UB_i$>1) then $UB_i$=1
    elseif($UB_i$>-1) then $UB_i$=-1
    elseif($UB_i$>-3) then $UB_i$=-3
       else $UB_i$=$UB_i$
    if($LB_i$<-3) then $LB_i$=-3
    elseif($LB_i$<-1) then $LB_i$=-1
    elseif($LB_i$<1) then $LB_i$}=1
    elseif($LB_i$<3) then $LB_i$=3
       else $LB_i$=$LB_i$ In addition to the boundary conditions previously derived, it is also advisable to define a new vector scheme=[$sch_1$, $sch_2$, ..., $sch_{2N_t}$], whose values will contain the modulation method used in each transmitted antenna (for example, 1 for 4-QAM and 2 for 16-QAM). This way, the Sphere Decoder can detect symbols from 4-QAM and 16-QAM constellations transmitted at different antennas.

As described earlier, the algorithm of the Sphere Decoder will start the search from the received symbol $2N_t$, move backwards to $2N_t-1$ and so on. Mixed detection simply requires that for each symbol i the appropriate set of comparisons are used depending on the value of $sch_i$. This way the search volume of the Sphere Decoder is adjusted based on the (known or guessed) modulation of $\hat{x}_i$.

With these conditions, the algorithm of the Mixed 4-QAM/16-QAM Sphere Decoder is created as shown in FIG. 5, where either the vector $L_{4QAM}$ or the vector $L_{16QAM}$ should be used in the calculation of $LB_i$ and $UB_i$. In FIG. 5, the symbol enum() denotes the set of candidates of the $i^{th}$ symbol, given by the upper and lower limits of $\hat{x}_i$; the symbol length() gives the number of symbols contained in this set keeping the value in $N_i$; and the symbol sort() sorts the set in ascending order, according to $|y_{ij}-S_i|^2$ for $1 \leq j \leq N_i$ with the output stored in the vector $z_i$.

In step 501, variable ntx is set equal to the number of columns of the upper-diagonal matrix U (in other words, to $2N_t$). In step 501, values for $q_{ii}$ and $q_{ij}$ are also set as discussed above in connection with Equation 5. In step 502, $T_{nxt}$, dbest and S are initialised. In step 503, variable ix, which corresponds to the index i, is initialized to be equal to the number of columns of the upper-diagonal matrix U. Steps 504 to 511 relate to finding a valid lattice point as a candidate for $\hat{x}$. The lattice points within the search range between $LB_{ix}$ and $UB_{ix}$ are stored in vector $z_{ix}$ of length $N_{ix}$. $N_{ix}$ is a number of found lattice points within the search range, $X_{ix}$ is an index within the vector $z_{ix}$ and elements within $z_{ix}$ are sorted according to how close they are to the center of the sphere. In step 504, the upper limit $UB_{ix}$ and the lower limit $LB_{ix}$ are calculated in accordance with Equations 7 and 8. Vectors $y_{ix}$ and $z_{ix}$ and also index $X_{ix}$ in step 504 relate to the reduced complexity sphere decoder algorithm, as discussed above. Index $X_{ix}$ is initialised to zero in step 504 and increased by one in step 505, for starting the search from the center of the sphere. Step 506 relates to keeping the search within the search sphere. In step 507 it is checked, whether all symbols for a lattice point have been determined. If not, steps 508 to 511 are carried out and steps 504 to 507 are repeated. Steps 508 and 509 relate to Equations 9 and 10. In step 510 a counter is updated; this counter relates to counting the number of iterations within the sphere decoder algorithm. In step 511, the variable ix is decreased so that in the next round-steps 504 to 509 relate to the next received symbol $2N_t-1$.

When a valid lattice point has been found, the algorithm continues to step 512, where the squared distance between the found lattice point and the received point is determined. If the squared distance is smaller for the latest found lattice point than earlier found lattice points (step 513), the algorithm proceeds to step 514. This step 514 the sphere radius is reduced, the upper and lower boundaries are updated, and the found lattice point is stored in vector $\hat{x}$ in accordance with the reduced complexity sphere decoder algorithm. The algorithm then continues via step 515 to find a next valid lattice point starting from step 505. If the reduced complexity algorithm has already proceeded to the surface of the search sphere, the search radius is increased in step 516. Thereafter it is checked in step 517, whether a valid lattice point has been stored to vector $\hat{x}$. If a valid lattice point has been stored to $\hat{x}$, the algorithm outputs this lattice point. Otherwise, the algorithm restarts at step 502 with the bigger search sphere radius.

Steps 518 to 520 relate to finding no valid lattice symbol for a current received symbol corresponding to index i for the considered $X_{ix}$, then the method steps back (that is, ix=ix+1) and continues with the next candidate from z. In the case, if the current received symbol corresponds to i=$2N_t$, the algorithm continues with a bigger search radius (via steps 515, 516 and 517 to step 502). Otherwise, the algorithm goes back to index i+1 (step 520) and continues from step 505 using a different candidate symbol corresponding to index i+1.

It is appreciated that although the Mixed Sphere Decoder for signal detection is discussed above in connection with 4-QAM and 16-QAM modulation schemes, it is not restricted to these modulation schemes nor to this specific combination. Based on the presented algorithm it is clear to one skilled in the art how to modify the algorithm for decoding symbols relating to more than two different modulation schemes. It is appreciated that application, for example, to M-PSK (Phase Shift Keying) is possible to one skilled in the art.

It is also appreciated that although the symmetric example of $N_t=N_r$ is discussed above, the Mixed Sphere Decoder for signal detection may be modified to cope with other cases. This is true also for any Sphere Decoder for signal detection, including Soft Output Sphere Decoder and Soft Additional Input Sphere Decoder discussed in this description. Cases where $N_t<N_r$ do not need special considerations, and the Sphere Decoder can be executed with no problem using the algorithms previously described. However, when $N_t>N_r$ the Cholesky decomposition, which is used above to find U, fails since there is not a positive definitive matrix anymore. More than that, in this case the system is under-determined and has many solutions. In that case the channel correlation matrix should be regularized, e.g., by adding positive non-zero values on the diagonal of said correlation matrix. Asymmetric Sphere Decoders have been discussed, for example, by M. O.

Damen, K. Abed-Meraim and J.-C. Belfiore in "A Generalized Sphere Decoder For Asymmetrical Space-Time Communication Architecture", *IEE Electronics Letters*, Vol. 36, No. 2, January 2000, pp. 166-167.

In order to find the optimum solution to the system it is necessary to apply single values decomposition (SVD) to the channel matrix H and proceed as follows:

1) Decompose H with single values decomposition in three matrices [Y, Σ, V]=SVD(H), where H=YΣV$^T$. Σ is a (N$_r$×N$_t$) upper semi-diagonal matrix, Y (N$_r$×N$_r$), and (N$_t$×N$_t$). Y and V are unitary matrices with YY$^T$=I$_{Nr}$ and V$^T$V=I$_{Nt}$.
2) Substitute, in the received vector r=Hx+n, the decomposed matrix H as r$_1$←Y$^T$r=ΣV$^T$x+n$_1$, with n$_1$=Y$^T$n.
3) Find the matrix U as the Incomplete Cholesky Factorization of ΣV$^T$, such that U$^T$U=ΣV$^T$(ΣV$^T$)$^T$, filling all the zero eigenvalues of U} with a small number, for example with $10^{-30}$.
4) Apply the Mixed Sphere Decoder algorithm to r$_1$.

The flowchart of the Asymmetric Sphere Decoder for signal detection is very similar to than the one for the Mixed Sphere Decoder for signal detection in FIG. 5. The only difference lies in the creation of the U input parameter, as discussed above.

When information is transmitted and distorted in a noisy channel, the data becomes fuzzy and any decision made in the receiver side may lead to errors and lost of information. Soft detection has the target of keeping some reliability information on a detected symbol and making a "hard" decision as late as possible in the receiver. The Sphere Decoder was originally designed as a "hard" output detector, returning the vector of constellation symbols with the shortest Euclidean distance to the received vector.

The most common way to express soft output values is to use log-likelihood ratios (LLR) per bit. Log-likelihood ratios per bit are used below as an example of soft output values, but other soft output values, for example probabilities or some other reliability approximation, may be used. Log-likelihood ratios are, however, easier to handle than probabilities. It is appreciated that the log-likelihood ratios LLR are for bits, not for symbols. This is because bit-wise LLR is needed for channel decoding purposes.

The log-likelihood ratio LLR is defined mathematically as $$LLR(c_j^i \mid r_i) = \log \frac{P[c_j^i = 1 \mid r_i]}{P[c_j^i = 0 \mid r_i]} \quad \text{(Eq. 11)}$$

where r=[r$_1$, r$_2$, r$_3$, ...] is the vector representing the received signal, $c_j^i$ denotes the jth bit of the ith symbol and $$P\left[c_j^i = \begin{matrix} 1 \\ 0 \end{matrix} \mid r_i\right]$$

denotes the probability that bit $c_j^i$ is 1 or 0 given $r_i$.

Figure 6:
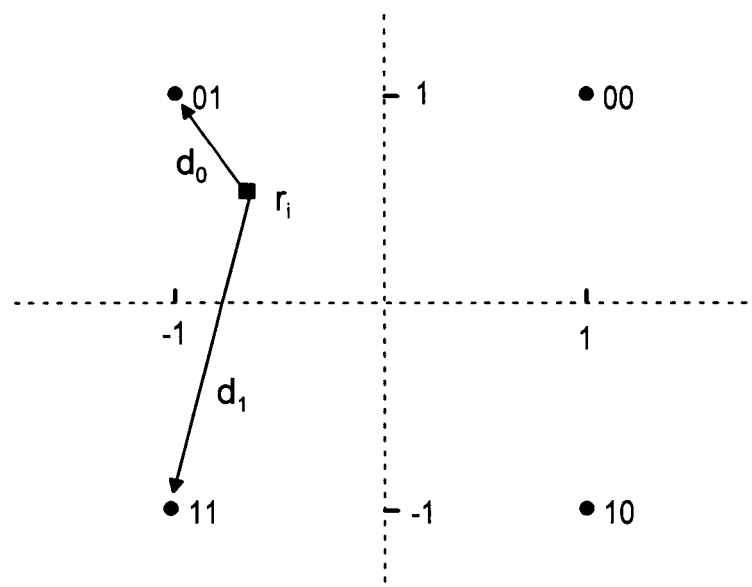
FIG. 6 shows, as an example, a 4-QAM constellation with Gray Mapping showing the distances from a received point to closest constellation points where the first bit is 0 and 1.

The probabilities in this equation may be calculated with the ratio between the Euclidean distances of a received symbol and the closest constellation point in which a particular bit has the logical value 1 or 0. FIG. 6 shows an example relating to a 4-QAM constellation with Gray mapping and to the first bit (most significant bit, MSB) of a received point $r_i$. The Euclidean distances $d_0$ and $d_1$ will serve to obtain to probabilities P[$c_j^i$=1|$r_i$] and P[$c_j^i$=0|$r_i$] as $$P[c_1^i = 1 \mid r_i] = \frac{d_0}{d_0 + d_1} \quad \text{(Eq. 12)}$$

$$P[c_1^i = 0 \mid r_i] = \frac{d_1}{d_0 + d_1}$$

In order to obtain these distances one should limit the search of the Sphere Decoder to constellation points in which the bit has a particular logical value. In the previous example, one first needs to find $d_0$ from the two upper constellation points and then $d_1$ from the two lower constellation points. To do this, different sub-constellations may be defined for different bits. As explained above, the real and imaginary part of the received set of symbols are decomposed and placed within a vector of length 2N$_r$. In a similar way, it is possible to separate the 4-QAM and the 16-QAM constellations into bit values. In other words, it is possible to divide the constellation into one-dimensional axis from which each bit can take a value to represent a binary 1 or 0.

In the case of the 4-QAM constellation shown in FIG. 6 the symbols are formed by two bits, each one taking the logical value 1 or 0, depending on the position in the axis. The first bit of all symbols takes the logical value 0 when it is located in the positive part of the imaginary axis and the logical value 1 when it is in the negative part of the imaginary axis. The same happens with the second bit in the real axis.

To be consistent with the decomposition of the vector r which has been decomposed as denoted by $$r^{dagger} = \begin{bmatrix} \text{Real}(r) \\ \text{Imag}(r) \end{bmatrix}$$

a new vector $c_d$, denoting the constellation decomposition, is defined as $$c_d = \begin{bmatrix} \text{Real}(r_i) \\ \text{Imag}(r_i) \end{bmatrix} = \begin{bmatrix} c_2^i \\ c_1^i \end{bmatrix} \quad \text{(Eq. 13)}$$

where $c_2^i$ refers to the second bit (least significant bit, LSB) of the 4-QAM symbols (the real part) and $c_1^i$ refers the first bit (MSB) (the imaginary part).

This new vector helps in creation of the other two, which will contain the constellation values to be used in the boundary conditions of the Sphere Detector, telling when a bit is a logical 1 or a logical 0. In other words, the sub-constellations in which one can find $d_0$ and $d_1$. These vectors are named L$_1$ and L$_0$ and have the length 2N$_r$, just as the decomposed r. Taking again the constellation of FIG. 6 and a N$_r$=1 case, these vectors for the point r$_1$ are $$L_1 = \begin{bmatrix} c_2^1 = 1 \\ c_1^1 = 1 \end{bmatrix} = \begin{bmatrix} -1 \\ -1 \end{bmatrix} \quad \text{(Eq. 14)}$$

$$L_0 = \begin{bmatrix} c_2^1 = 0 \\ c_1^1 = 0 \end{bmatrix} = \begin{bmatrix} 1 \\ 1 \end{bmatrix}$$

With the use of these vectors the comparisons to know if a bit is closer to being 1 or 0, during the iterations of the detector, are easier. As an example, let's consider the received point $r_1$ decomposed as $[r_{1\ Real}\ r_{1\ Imag}]^T$ and the vectors $L_1$ and $L_0$ of Equation 14. The algorithm will start the detection with the last point in $r_1$ and in this case with $r_{1\ Imag}$ which will be compared with the last element of the vectors $L_1$ and $L_0$ to find the bit likelihood of $c_1^{\ 1}$.

As pointed out in Equation 11 the probabilities of bit $c_1^{\ 1}$ are computed using the Euclidean distances between $r_{1\ Imag}$ and the elements $L_{1,2}$ and $L_{0,2}$. Letting the distances $d_1$ and $d_0$ to be $$d_1 = |r_{1\ Imag} - L_{1,2}|^2 + \min(d_a, d_b)\ d_0 = |r_{1\ Imag} - L_{0,2}|^2 + \min(d_a, d_b) \quad (Eq.\ 15)$$

where the operation $\min(a, b)$ refers to the minimum between a and b, and $$d_a = |r_{1\ Real} - L_{1,1}|^2$$

$$d_b = |r_{1\ Real} - L_{0,1}|^2$$

Figure 7:
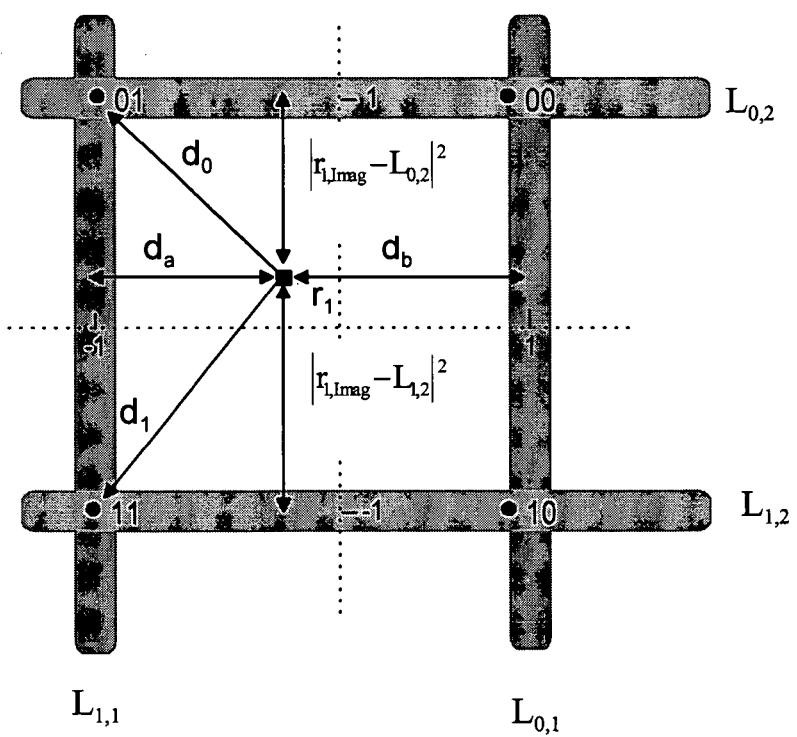
FIG. 7 shows, as an example, bit likelihood creation for the first bit of a received symbol $r_1$ in a 4-QAM system with one transmitter/receiver antenna.

With the help of Equation 12, Equation 11 becomes $$LLR(c_1^1 \mid r_1) = \log\left(\frac{d_0}{d_1}\right) \quad (Eq.\ 16)$$

$$= \log\left(\frac{|r_{1\ Imag} - L_{0,2}|^2 + \min(d_a, d_b)}{|r_{1\ Imag} - L_{1,2}|^2 + \min(d_a, d_b)}\right)$$

and it is possible to give soft output. The concept is shown graphically in FIG. 7.

In the next iteration, the point $r_{1\ Real}$ will be compared with elements $L_{1,1}$ and $L_{0,1}$ to obtain $d_1$ and $d_0$ as $$d_1 = |r_{1\ Real} - L_{1,1}|^2 + \min(d_a, d_b)\ d_0 = |r_{1\ Real} - L_{0,1}|^2 + \min(d_a, d_b) \quad (Eq.\ 17)$$

where this time the distances $d_0$ and $d_1$ are $$d_a = |r_{1\ Imag} - L_{1,2}|^2$$

$$d_b = |r_{1\ Imag} - L_{0,2}|^2$$

and the LLR becomes $$LLR(c_2^1 \mid r_1) = \log\left(\frac{d_0}{d_1}\right) \quad (Eq.\ 18)$$

$$= \log\left(\frac{|r_{1\ Real} - L_{0,1}|^2 + \min(d_a, d_b)}{|r_{1\ Real} - L_{1,1}|^2 + \min(d_a, d_b)}\right)$$

This procedure can be extended to any value of $N_t$. As an example, the vectors $L_1$ and $L_0$ of an $N_t=2$ system are given next:

$$L_1 = \begin{bmatrix} c_2^1 = 1 \\ c_2^2 = 1 \\ c_1^1 = 1 \\ c_1^2 = 1 \end{bmatrix} = \begin{bmatrix} -1 \\ -1 \\ -1 \\ -1 \end{bmatrix} \quad (Eq.\ 19)$$

$$L_0 = \begin{bmatrix} c_2^1 = 0 \\ c_2^2 = 0 \\ c_1^1 = 0 \\ c_1^2 = 0 \end{bmatrix} = \begin{bmatrix} 1 \\ 1 \\ 1 \\ 1 \end{bmatrix}$$

Figure 8:
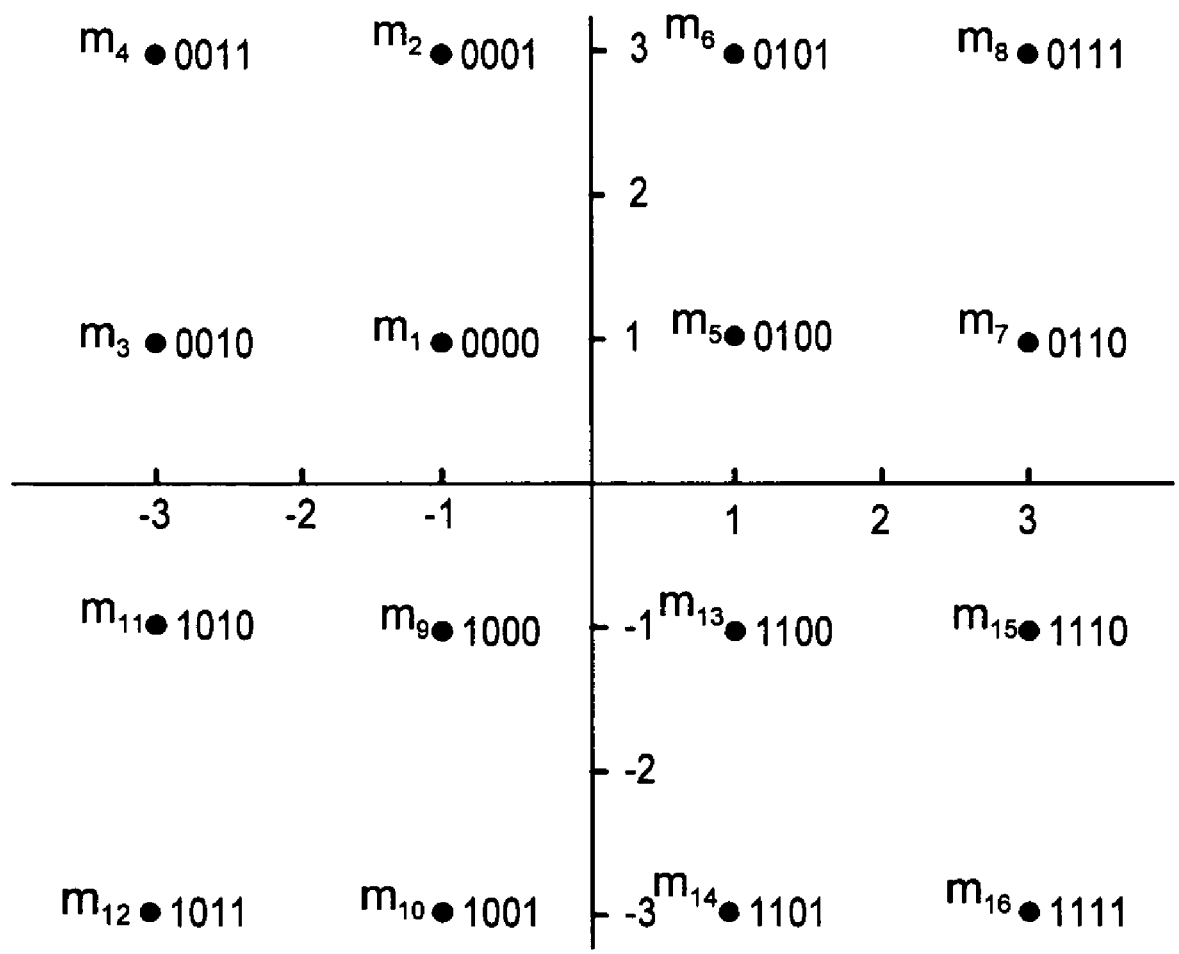
FIG. 8 shows a 16-QAM constellation with Gray Mapping which is used as an example.

For the case of 16-QAM constellations the decoupling in bits is slightly more complicated since each symbol is represented by four bits. The constellation with Gray mapping shown in FIG. 8 will be used as an example below. It is appreciated that Gray mappings are used in this description as an example of a mapping between a set of bit sequences and a set of symbols.

This time the constellation will be split first into two parts, each one containing one bit from the real axis and one bit from the imaginary axis to comply with the decoupling of r. This results in two different vectors $c_{d1}$ and $c_{d2}$, which for a $N_t=1$ case are $$c_{d1} = \begin{bmatrix} Real_1(r_1) \\ Imag_1(r_1) \end{bmatrix} = \begin{bmatrix} c_2^1 \\ c_1^1 \end{bmatrix} \quad (Eq.\ 20)$$

$$c_{d2} = \begin{bmatrix} Real_2(r_1) \\ Imag_2(r_1) \end{bmatrix} = \begin{bmatrix} c_3^1 \\ c_4^1 \end{bmatrix}$$

where $c_1^{\ 1}$ is the first bit (MSB) and $c_4^{\ 1}$ is the last bit (LSB) of the $r_1$ symbol, noticing that $c_2^{\ 1}$ and $c_3^{\ 1}$ represent the real axis and $c_1^{\ 1}$ and $c_4^{\ 1}$ the imaginary axis. These vectors help to create the set of matrices $L_{1c_{d1}}$, $L_{1c_{d2}}$, $L_{0c_{d1}}$ and $L_{0c_{d2}}$, containing the values in which each bit represents a 1 or 0 in the constellation. These matrices can be seen, again, as a smaller constellations in which the Sphere Detector searches for a particular logical value of a bit. In the case of the constellation of FIG. 8 and $N_t=1$ these matrices are $$L_{1c_{d1}} = \begin{bmatrix} c_2^1 = 1 \\ c_1^1 = 1 \end{bmatrix} = \begin{bmatrix} 1 & 3 \\ -3 & -1 \end{bmatrix} \quad (Eq.\ 21)$$

$$L_{0c_{d1}} = \begin{bmatrix} c_2^1 = 0 \\ c_1^1 = 0 \end{bmatrix} = \begin{bmatrix} -3 & -1 \\ 1 & 3 \end{bmatrix}$$

$$L_{1c_{d2}} = \begin{bmatrix} c_3^1 = 1 \\ c_4^1 = 1 \end{bmatrix} = \begin{bmatrix} -3 & 3 \\ -3 & 3 \end{bmatrix} \quad (Eq.\ 22)$$

$$L_{0c_{d2}} = \begin{bmatrix} c_3^1 = 0 \\ c_4^1 = 0 \end{bmatrix} = \begin{bmatrix} -1 & 1 \\ -1 & 1 \end{bmatrix}$$

where each bit can take one of two values, in its axis, to represent a logical 1 or a logical 0.

With the use of these new matrices the procedure to find a likelihood for a bit can be summarized in five steps:

1. Find the closest point to the received symbol, from the constellation axis that does not belong to the bit in consideration, and save this distance as $d_p$.
2. Find the closest point to the received symbol, from the pair of constellation axis in which the bit in consideration takes the logical value 0, and save this distance as $d'_0$.

3. Find the closest point to the received symbol, from the pair of constellation axis in which the bit in consideration takes the logical value 1, and save this distance as $d'_1$.
4. Calculate the Euclidean distances $d_0$ and $d_1$ as $d_0=d_p+d'_0$ and $d_1=d_p+d'_1$.
5. Finally, with the use of Equations 12 and 11 the bit likelihoods are obtained.

Figure 9:
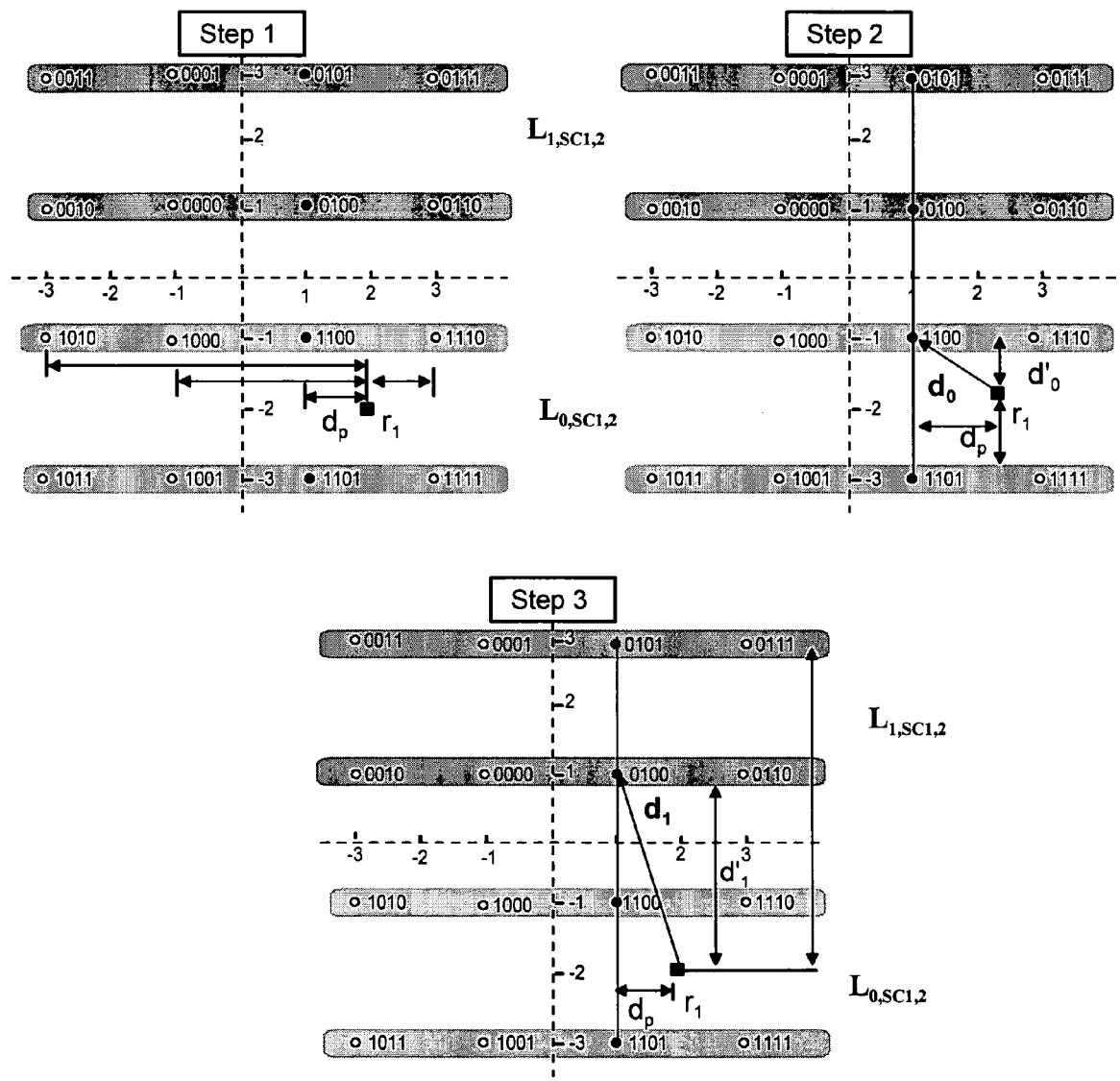
FIG. 9 shows, as an example, steps for obtaining distances $d_0$ and $d_1$ for the first bit of a received symbol $r_1$ in a 16-QAM system with one transmitter/receiver antenna.

Considering the received point $r_1$ decomposed and decoupled in $c_{d1}$ and $c_{d2}$ as in Equation 20 and the matrices of Equation 21, the steps to obtain $d_0$ and $d_1$ are graphically depicted in FIG. 9.

To extend the system into any number $N_t$ of transmitting antennas, the first row of the $L_1$ and $L_0$ matrices should be repeated $N_t$ times, and to the second row. As an example, the $L_1$ and $L_2$ matrices of a $N_t=2$ system are presented below:

$$L_{1_{c_{d1}}} = \begin{bmatrix} 1 & 3 \\ 1 & 3 \\ -3 & -1 \\ -3 & -1 \end{bmatrix}, L_{1_{c_{d2}}} = \begin{bmatrix} -3 & 3 \\ -3 & 3 \\ -3 & 3 \\ -3 & 3 \end{bmatrix} \quad \text{(Eq 23)}$$

$$L_{0_{c_{d1}}} = \begin{bmatrix} -3 & -1 \\ -3 & -1 \\ 1 & 3 \\ 1 & 3 \end{bmatrix}, L_{0_{c_{d2}}} = \begin{bmatrix} -1 & 1 \\ -1 & 1 \\ -1 & 1 \\ -1 & 1 \end{bmatrix}$$

These matrices, as well as vectors in Equation 19, depend on the Gray mapping choise which can vary, for example, as desired by the user. An observation should be made here to say that any Gray mapping will work for the decoupling method just described.

This method to create bit likelihoods is a simple way to create soft values, but the results are, however, not optimal. In order to create optimum results a Maximum Likelihood optimum detection method should be used, in which the soft values are created from the best vector of all possible. The drawback of a Maximum Likelihood optimum method are, as mentioned above, complexity. One example of Maximum Likelihood approach is discussed by B. M. Hochwald and S. T. Brink in "Achieving Near-Capacity on a Multiple-Antenna Channel", *IEEE Transactions on Communications*, Vol. 51, Issue 3, March 2003, pp. 389-399. Also S. Bäro, J. Hagenauer, and M. Witzke discuss soft values in "Iterative Detection of MIMO Transmission Using a List-Sequential (LISS) Detector", *IEEE International Conference on Communications ICC'03*, Vol. 4, 2003, pp. 2653-2657.

A Soft Output Sphere Decoder for signal detection in accordance with the second embodiment provides extra handling of hard results obtained by a hard Sphere Decoder. This way it is possible to keep the important characteristics of the Sphere Decoder, namely reduction in the sphere radius per iteration and searching inside a sphere. As mentioned above in connection with FIG. 3, it is alternatively possible to determine soft values in determining $\hat{x}_i$ and then make soft decisions regarding the next $\hat{x}_{i-1}$. As some examples, the hard Sphere Decoder may be a Soft Additional Input Decoder in accordance with the third embodiment of the invention and/or a Mixed Sphere Decoder. The hard Sphere Decoder may alternatively be any known hard Sphere Decoder.

The proposed extra handling of the hard results obtained by a hard Sphere Decoder has the following steps.
1. Take the results of the execution of a hard Sphere Decoder stored in vector $\hat{x}$.
2. Go through each of the $\hat{x}_{2N_t}, \hat{x}_{2N_t-1}, \ldots, \hat{x}_i$ symbols searching for the closest constellation symbols in which each one of its $c_j^i$ bits in turn is either 1 or 0 saving the Euclidean distances in each iteration.
3. Go also through the elements of vector $\rho=\lfloor \rho_{2N_t}, \rho_{2N_t-1}, \ldots, \rho_1 \rfloor$ which is the received vector with the channel inverted. Make the same comparisons searching for the closest constellation points to this vector in which the bit in use is either 1 or 0, and save the Euclidean distances.
4. Weight the Euclidean distances found from comparing vector $\hat{X}$, for example, by a factor $2^{2N_t}-1$ and the ones found from vector $\rho$, for example, by one.
5. Calculate the likelihoods from the additions of both weighted distances to return as the output.

Figure 10:
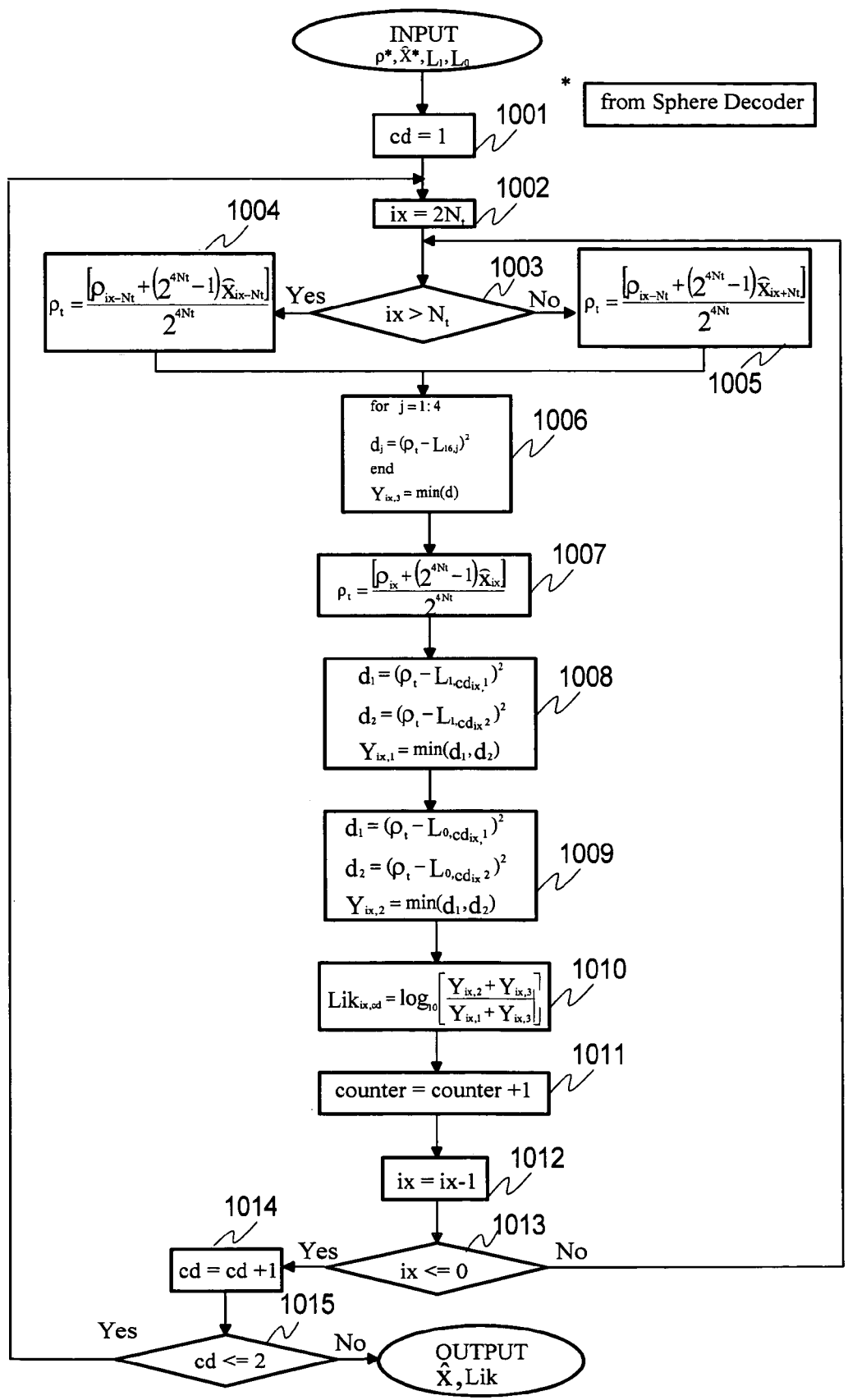
FIG. 10 shows, as an example, a flowchart for a 16-QAM Soft Output Sphere Decoder for signal detection in accordance with the second embodiment of the invention.

A flowchart for this algorithm, for 16-QAM constellations, is presented in FIG. 10. The flowchart in FIG. 10 has as input the symbols in vectors $\rho$ and $\hat{x}$ from the output of the Mixed Sphere Decoder shown in FIG. 5. A point to notice is the use of matrices $L_1$ and $L_0$ defined in Equation 21, which is given as an input parameter. It is appreciated that these matrices can vary depending on the (Gray) mapping used in the transmitter.

As mentioned above, for a 16-QAM constellation there are two different vectors $c_{d1}$ and $c_{d2}$. Step 1001 in FIG. 10 relates to selecting vector $c_{d1}$ for calculations. In step 1002 the index ix is initialized. Steps 1003, 1004 and 1005 relate to selecting the constellation axis that does not relate to the bit in consideration and also to weighting the channel inverted received point $\rho_i$ and the estimation $\hat{x}_i$ as mentioned above. In step 1006, the closest point of the selected constellation axis is determined. The distance to this closest point is denoted above with $d_p$. Steps 1007, 1008 and 1009 relate to determining the distances to the closest points from the pair of constellation axis, where the bit in consideration takes the logical value of 1 (step 1008) and 0 (step 1009). These distances are denoted above with $d'_0$ and $d'_1$. In step 1010 the bit likelihoods are calculated using Equations 11 and 12. In step 1011 a counter is updated; this counter relates to counting the number of iterations within the sphere decoder algorithm. In step 1012 index ix is updated for determining bit likelihoods for a next symbol. In step 1013 it is checked whether all components of a received point have been processed using vector $c_{d1}$. If all components of the received point have not yet been processed, the algorithm continues from step 1003. If all components of the received point have already been processed, vector $c_{d2}$ is taken into use in steps 1014 and 1015 and the algorithm continues from step 1002. When all components of the received point have been processed using also vector $c_{d2}$, this is noticed in step 1015 and the algorithm outputs vector $\hat{x}$ and the determined bit likelihoods.

For the 4-QAM case the matrices $L_1$ and $L_0$ are vectors, and instead of having two vectors $c_d$ there is only one. Therefore, in order to make this algorithm work with 4-QAM constellations, the variable $c_d$ in the algorithm of FIG. 10 should always be one, $L_1$ and $L_0$ should be treated as vectors, and the vector $L_{16QAM}$ should be replaced by $L_{4QAM}$.

The third embodiment of the invention is directed to processing soft additional a priori information, typically in form of probabilities. This additional a priori information may improve symbol detection. To be able to receive and process soft a priori information, internal operation of the Sphere Decoder is modified. As discussed above, original Sphere Decoder makes hard decisions during iterations. A Sphere Decoder for signal detection in accordance with the second embodiment of the invention generates soft outputs based on the outcome of a Sphere Decoder making hard decisions. In the third embodiment, the aim is to create soft symbols during iterations of the Sphere Decoder. While creating a soft symbol, any a priori information may be processed. Typically the soft a priori information is used to weight and possibly correct the symbol.

For processing a priori information per bit, it is possible to introduce a new vector $p_{ap}$ containing probabilities or other a priori reliability information. Probabilities are used here as an example of a priori information. The probabilities may relate, for example, to the transmitted bits being equal to 1. The vector $p_{ap}$ contains, as an example and to be in line with the description above, $2N_t$ elements for 4-QAM constellations and $4N_t$ elements for 16-QAM constellations. The elements are typically arranged according to the real and imaginary decomposition of the vector r representing the received signal, in a similar way than described by the vector $c_d$ in Equations 13 and 20. As a specific example, 4-QAM and 16-QAM systems with $N_t$=2 are considered where the vectors $p_{ap}$ are given for 4-QAM by $$p_{ap,4QAM} = \begin{bmatrix} P(c_2^1 = 1) \\ P(c_2^2 = 1) \\ P(c_1^1 = 1) \\ P(c_1^2 = 1) \end{bmatrix} \text{ and for 16-}QAM \text{ by} \quad \text{(Eq. 24)}$$

$$p_{ap,16QAM,1} = \begin{bmatrix} P(c_2^1 = 1) \\ P(c_2^2 = 1) \\ P(c_1^1 = 1) \\ P(c_1^2 = 1) \end{bmatrix}, p_{ap,16QAM,2} = \begin{bmatrix} P(c_3^1 = 1) \\ P(c_3^2 = 1) \\ P(c_4^1 = 1) \\ P(c_4^2 = 1) \end{bmatrix} \quad \text{(Eq. 25)}$$

where $c_j^i$ denotes the $j^{th}$ bit of the $i^{th}$ symbol, $P(c_j^i=1)$ refers to the probabilitiy that bit $c_j^i$ has the logical value 1 and $c_1^i$ refers to the MSB of symbol i. In the case when there is not a priori information, the vector(s) $p_{ap}$ may be filled with zeros.

The method to create soft symbols during the iterations consists of weighting the candidate symbols by the ratio of the Euclidean distances between the received symbol $r_i$ and the axis coordinates, in which the bit in consideration has the value of 1 or 0 given by vectors $L_1$ and $L_0$.

It is appreciated that although this specific example relates to weighting candidate symbols, in other words weighting the lattice, it is alternatively possible to weight the received symbol. It is also possible to weight both the lattice and the received symbol. It is furthermore appreciated that weighting is here used as an example of any modification of the lattice or received symbol based on a priori information.

In the following a soft additional input Sphere Detector for signal detection is constructed based on a Soft Output Sphere Decoder in accordance with the second embodiment of the invention. It is, however, appreciated, that it is possible alternatively to construct a Soft Additional Input Sphere Detector where the output symbols are hard.

As an example, consider the 4-QAM Soft Output Sphere Detector for signal detection. Each element of the decomposed received vector r represents one bit, as explained by Equation 13 for 4-QAM with $N_t$=1. Starting from the last element of the received signal r and going backwards, a probability that bit $c_j^{2N_t}$ is 1 is created. The probability is calculated with the distance between $\rho_{2N_t}$ and the closest constellation symbol in which the considered bit is 0 or 1 as described in FIG. 6 and Equation 12. The bit probability is saved in $$P_{\rho,c_j^{2N_t}=1}.$$

The average of this probability and the a priori probability contained in $p_{ap}$ for the same bit $c_j^{2N_t}$ is calculated and stored as $$P_{c_j^{2N_t}=1} = \frac{P_{\rho,c_j^{2N_t}=1} + p_{ap,c_j^{2N_t}=1}}{2}.$$

This averaged probability will be used to weight the candidates within the boundaries, stored in vector $z_i$ as $$z_{2N_t,k} \times = P_{c_j^{2N_t}=1} \text{ for } z_{2N_t,k} \in L_1 \text{ and}$$

$$z_{2N_t,k} \times (1 - P_{c_j^{2N_t}=1}) \text{ for } z_{2N_t,k} \in L_0.$$

Figure 11:
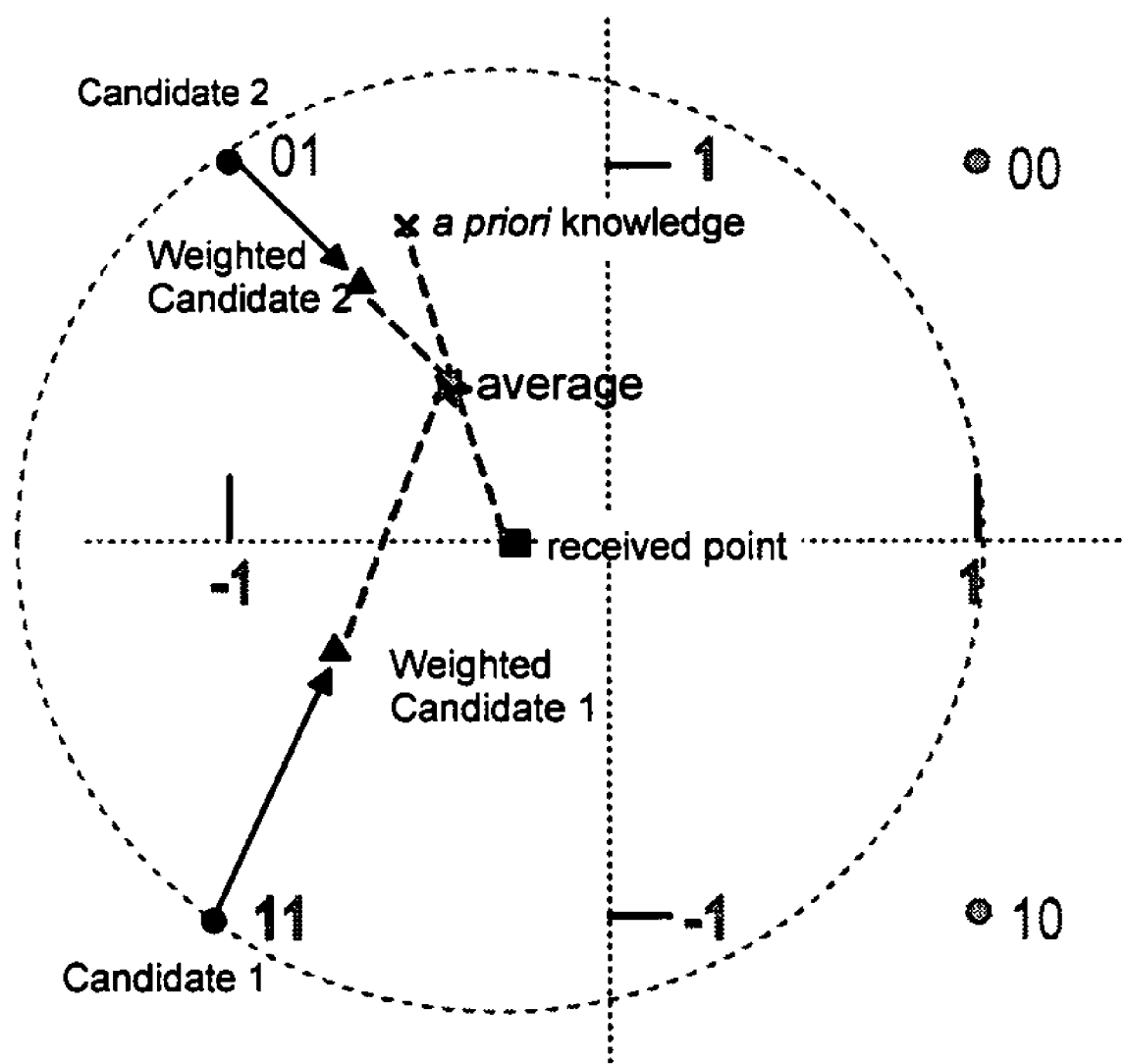
FIG. 11 shows, as an example, weighted candidates for a Soft Additional input Sphere Decoder for a 4-QAM system, in accordance with the third embodiment of the invention.

Here $2N_t$ denotes the current symbol to be iterated, j denotes the current bit being considered and k denotes the current candidate contained in $z_{2N_t}$. The concept of the creation of weighted candidates for the Sphere Decoder in a 4-QAM system is shown graphically in FIG. 11.

The algorithm selects from the weighted candidates the closest to the received point and keeps it as the solution $\hat{x}_{2N_t}$, which is then used to find the next point $\hat{x}_{2N_t-1}$ and so on. At the end, the soft values are created by using the vector $\hat{x}$, which this time is soft, and finding the Euclidean distance between its elements and the closest constellation symbols in which a particular bit is one or zero. The distances are then used to create, for example, the Log Likelihood Ratios as $$LLR(c_j^i \mid r_i) = \log\left(\frac{d_o}{d_1}\right) = \log\left(\frac{|\hat{x}_i - L_{0,j}|^2 + \min(d_a, d_b)}{|\hat{x}_i - L_{1,j}|^2 + \min(d_a, d_b)}\right) \quad \text{(Eq 26)}$$

where for $i > N_t$ $$d_a = |\hat{x}_{i-N_t} - L_{1,j}|^2$$

$$d_b = |\hat{x}_{i-N_t} - L_{0,j}|^2$$

and for $i \leq N_t$ $$d_a = |\hat{x}_{i+N_t} - L_{1,j}|^2$$

$$d_b = |\hat{x}_{i+N_t} - L_{0,j}|^2.$$

For the 16-QAM cases the algorithm is more complicated, just as in the soft output case. The concept, although, is the same: the creation of weighted candidates during the iterations. This time each of the $\rho_i$ received points, decomposed in real and imaginary part, represents two bits and can be split as described by Equations 20 and 21 into two different matrices $L_1$ and $L_0$.

Each of the two bits contained in points $\rho_{i,Real}$ and $\rho_{i,Imag}$ gives different information about the constellation symbol it represents. Let's consider the constellation in FIG. 8 and the point $\rho_{1,Imag}$ which represents the imaginary part of the received point $\rho_1$ in a $N_t$=1 system. The bit $c_1^1$, which is the first bit (MSB) in the symbols, tells the sign of the symbol in the imaginary axis, 0 means positive and 1 negative. The bit $c_4^1$, the fourth bit of the symbols (LSB), tells if the symbol is in the point ±1 or ±3 of the imaginary axis.

Figure 12:
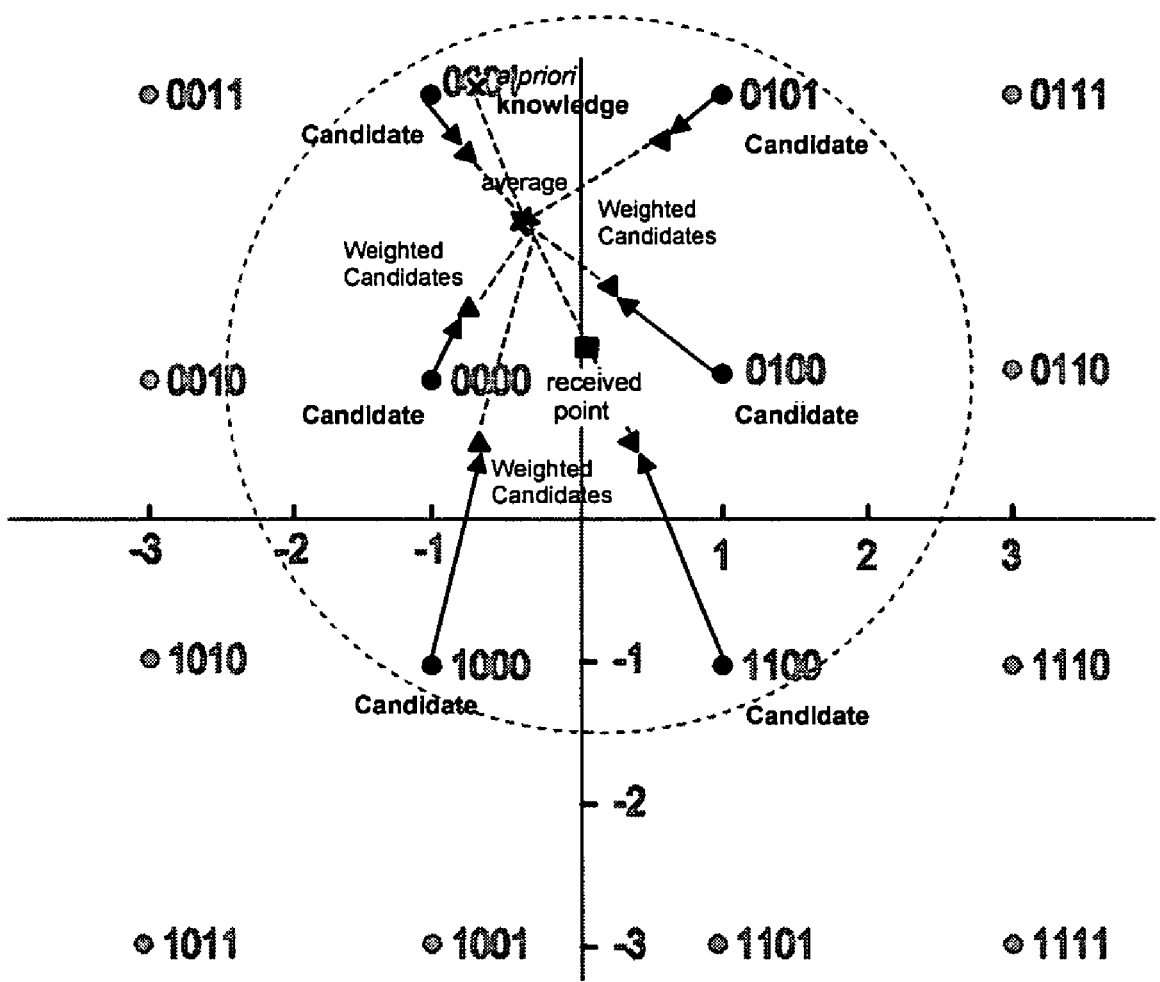
FIG. 12 shows, as an example, weighted candidates for a Soft Additional Input Sphere Decoder for a 16-QAM system, in accordance with the third embodiment of the invention.

The weighting of the candidate points is done with the product of the probabilities of the bit $c_4^1$ and $c_1^1$. This moves the constellation candidates closer to the received point and creates weighted symbols. The concept is shown graphically in FIG. 12.

The weighted candidates will be found, as in the 4-QA case, with the use of vector ρ and any a priori information. The best candidate will be selected as $\hat{x}_i$ during iterations, and this point will be used to find the next $\hat{x}_{i-1}$. Finally, the soft values are found from the vector $\hat{x}$.

Figure 13A:
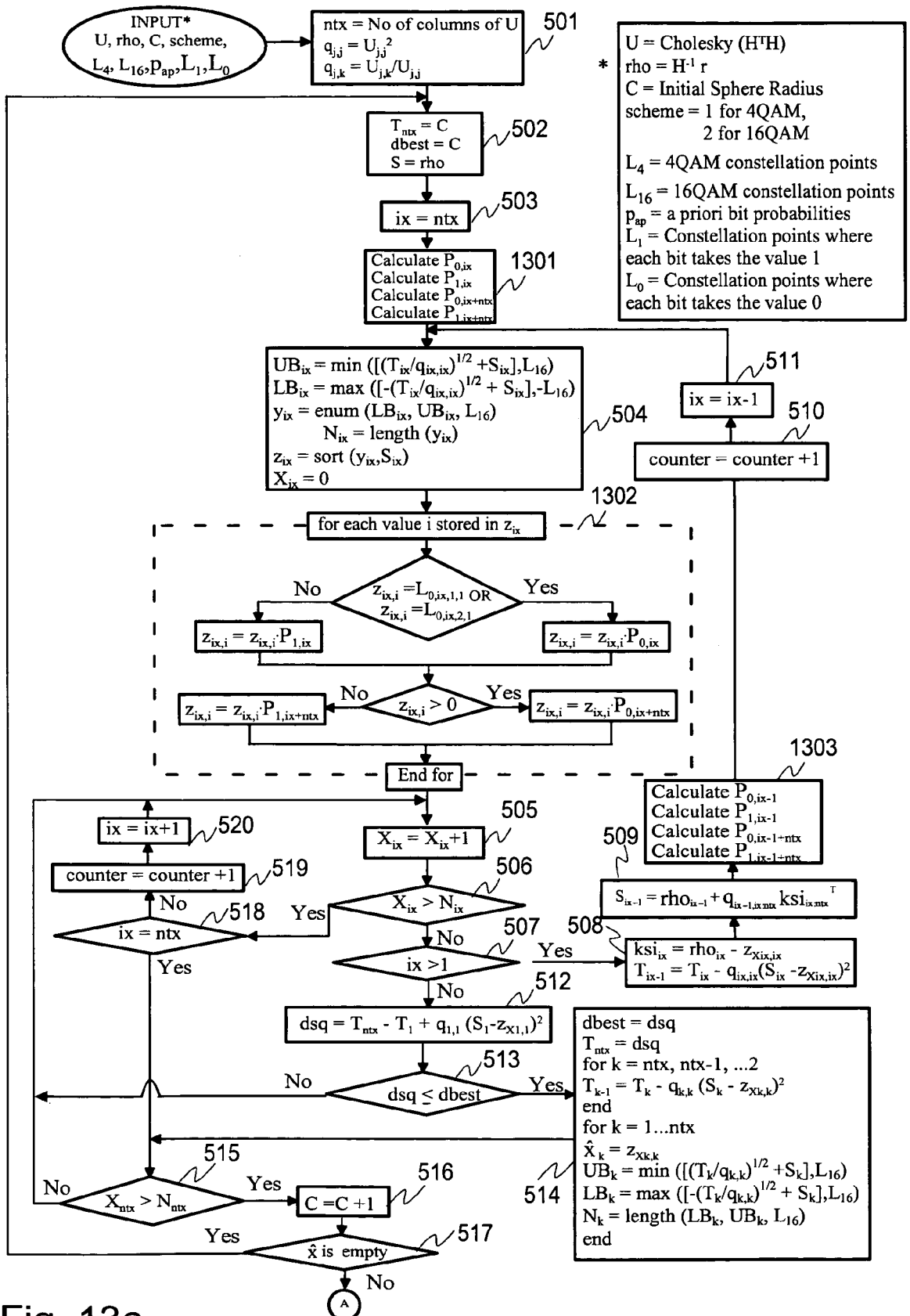
FIG. 13A shows, as an example, a first part of a flowchart for a 16-QAM Soft Additional Input Sphere Decoder for signal detection in accordance with the third embodiment of the invention.
Figure 13B:
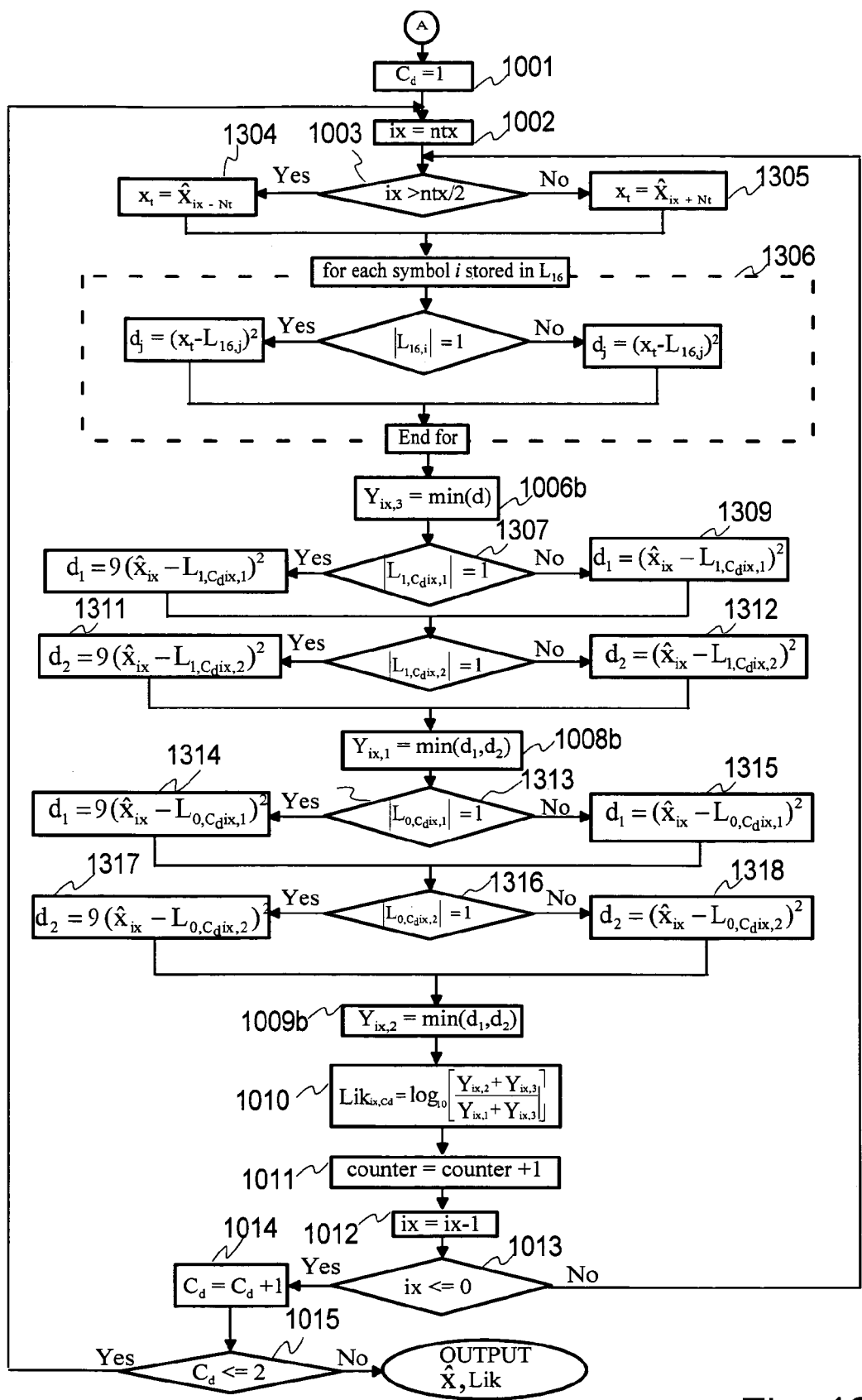
FIG. 13B shows the second part of the flowchart in FIG. 13A.

The flowchart showing the algorithm of the Soft Additional Input Sphere Decoder is shown in FIGS. 13A and 13B. FIG. 13A contains the algorithm that creates the weighted symbols, and FIG. 13B depicts the method to obtain soft output values. It should be observed that there is a new input parameter $p_{ap}$ which contains, in accordance with this specific example, the probabilities for each bit being 1 of each symbol. Those steps in FIGS. 13A and 13B, which are similar to steps in FIGS. 5 and 10, are marked with the same reference numerals as in FIGS. 5 and 10.

The beginning of the Soft Additional Input Sphere Decoder algorithm shown in FIG. 13A is to a large extent very similar to the algorithm in FIG. 5. The differences are a few additional steps (1301, 1302 and 1303) and the fact that the algorithm continues after step 517 instead of simply outputting the results. The algorithm in FIG. 13A thus starts with steps 501 to 503 and thereafter in step 1301 the bit probabilities $P_{0,ix}$, $P_{1,ix}$, $P_{0,ix+ntx}$ and $P_{1,ix+ntx}$ are calculated as $$P_{0,ix} = \frac{1}{2}\left(\frac{(|\rho_{ix}| - |L_{1,ix,1,1}|)^2}{(|\rho_{ix}| - |L_{1,ix,1,1}|)^2 + (|\rho_{ix}| - |L_{0,ix,1,1}|)^2} + (1 - p_{ap,ix})\right)$$

$$P_{1,ix} = \frac{1}{2}\left(\frac{(|\rho_{ix}| - |L_{0,ix,1,1}|)^2}{(|\rho_{ix}| - |L_{1,ix,1,1}|)^2 + (|\rho_{ix}| - |L_{0,ix,1,1}|)^2} + p_{ap,ix}\right)$$

$$P_{0,ix+nxt} = \frac{1}{2}\left(\frac{(\rho_{ix} - L_{1,ix,1,2})^2 + (\rho_{ix} - L_{1,ix,2,2})^2}{(\rho_{ix} - L_{1,ix,1,2})^2 + (\rho_{ix} - L_{1,ix,2,2})^2 + (\rho_{ix} - L_{0,ix,1,2})^2 + (\rho_{ix} - L_{0,ix,2,2})^2} + (1 - p_{ap,ix+nxt})\right)$$

$$P_{1,ix+nxt} = \frac{1}{2}\left(\frac{(\rho_{ix} - L_{0,ix,1,2})^2 + (\rho_{ix} - L_{0,ix,2,2})^2}{(\rho_{ix} - L_{1,ix,1,2})^2 + (\rho_{ix} - L_{1,ix,2,2})^2 + (\rho_{ix} - L_{0,ix,1,2})^2 + (\rho_{ix} - L_{0,ix,2,2})^2} + p_{ap,ix+nxt}\right)$$

Here $P_{0,ix}$ and $P_{1,ix}$ denote the probabilities of the bits $C_3^i$ and $c_4^i$, which tell about the symbol taking the value ±1 or ±3 in each axis, and thus can be calculated using the absolute values. $P_{0,ix+nxt}$ and $P_{1,ix+nxt}$ give probabilities for the bits $c_2^i$ and $c_1^i$, which give the sign of the symbol for each axis. Therefore, the absolute values cannot be used.

The algorithm continues with 504, and thereafter in step 1302 the candidate constellation symbols stored in vector $z_{ix}$ are weighted using the calculated bit probabilities. If the candidate symbol $z_{ix,i}$ is equal to either $L_{0,ix,1,1}$ or $L_{0,ix,2,1}$, the bit probability $P_{1,ix}$ is used to weight $z_{ix,i}$. Otherwise, the bit probability $P_{0,ix}$ is used to weight $z_{ix,i}$. If the thus weighted candidate $z_{ix,i}$ is larger than zero, further weighting is carried out using the bit probability $P_{0,ix+ntx}$. Otherwise, further weighting is carried out using the bit probability $P_{1,ix+ntx}$. Thereafter the algorithm in FIG. 13A continues similarly as the algorithm in FIG. 5, except for step 1303 after steps 509.

In step 1303, the bit probabilities $P_{0,ix-1}$, $P_{1,ix-1}$, $P_{0,ix-1+ntx}$ and $P_{1,ix-1+ntx}$ are calculated similarly as bit probabilities in step 1301.

In FIG. 13B the algorithm continues after step 517 by carrying out steps 1001, 1002 and 1003. Steps 1003, 1304 and 1305 are for selecting the imaginary part of the estimate $\hat{x}_i$ for steps 1306 and 1006b, when the real part is currently processed, or the real part of the estimate xi, when the imaginary part is currently processed. In steps 1306 and 1006b the distance to the closest point of the selected constellation axis is determined with the help of the selected real/imaginary part, similarly as in step 1006 in FIG. 5. Similarly as step 1008 in FIG. 5, steps 1307 to 1312 and 1008b relate to determining the distances to the closest points from the pair of constellation axis, where the bit in consideration takes the logical value of 1. Steps 1313 to 1318 and 1009b relate to determining the distances to the closest points from the pair of constellation axis, where the bit in consideration takes the logical value of 0. After step 1009b the algorithm in FIG. 13B continues similarly as the algorithm in FIG. 10.

In step 1306, 1308, 1311, 1314 and 1317 it can be observed how Euclidean distance are weighted by a factor 9. This is to assure that the weighted symbols do not always tend to the value 1 of the axis. The number 9 is chosen to compensate for the square distance of the axis value 3.

The flowcharts in FIGS. 13A and 13B describe the 16-QAM case. For 4-QAM constellations the algorithm is simplified with vectors for $L_1$ and $L_0$ instead of matrices, and the use of only one bit probability to weight each candidate.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   receiving a first set of symbols representing a signal received in a receiver; and
   estimating a second set of symbols representing said signal transmitted at a transmitter using a sphere decoding technique, wherein said estimating defines a vector and each vector value of the vector contains a modulation scheme, said estimating concurrently employing at least two modulation schemes.

2. The method as defined in claim 1, wherein said estimating the second set of symbols comprises adjusting a search volume of the sphere decoding technique based on said at least two modulation schemes.

3. The method as defined in claim 1, wherein said estimating the second set of symbols comprises determining a modulation scheme of a symbol of said second set of symbols.

4. The method as defined in claim 3, wherein said estimating the second set of symbols comprises defining a search region for said symbol of said second set of symbols using the modulation scheme of said symbol.

5. The method as defined in claim 1, wherein said estimating step comprises employing said at least two modulation schemes, in which said at least two modulation schemes comprise at least two different quadrature amplitude modulation schemes.

6. The method as defined in claim 1, wherein said estimating comprises employing said at least two modulation schemes, in which said at least two modulation schemes comprise at least two different phase shift keying modulation schemes.

7. The method as defined in claim 1, further comprising determining reliability information relating to bits forming a symbol for at least one symbol of said second set of symbols.

8. The method as defined in claim 7, further comprising taking reliability information relating to said signal into account in estimating at least one symbol of the second set of symbols.

9. The method as defined in claim 1, further comprising taking reliability information relating to said signal into account in estimating at least one symbol of the second set of symbols.

10. A method, comprising:
receiving a first set of symbols representing a signal received at a receiver;
estimating a second set of symbols representing said signal transmitted at a transmitter using a sphere decoding technique;
determining a symbol constellation defining a relationship between a plurality of the second set of symbols and a plurality of bit sequences;
determining a first sub-constellation of the second set of symbols relating to a given bit of a bit sequence having a value of 1;
determining a second sub-constellation of the second set of symbols relating to a said given bit of a bit sequence having a value of 0; and
determining reliability information relating to bits forming a symbol for at least one symbol of said second set of symbols.

11. The method as defined in claim 10, wherein said estimating comprises estimating said second set of symbols step before said determining reliability information.

12. The method as defined in claim 10, further comprising determining the reliability information for at least a first symbol of said second set of symbols before estimating a second symbol of the second set of symbols.

13. The method as defined in claim 12, said estimating the second set of symbols step comprises using the reliability information relating to said first symbol of said second set of symbols in estimating said second symbol of said second set of symbols.

14. The method as defined in claim 10, further Comprising:
determining a smallest first distance between a symbol of said first set of symbols and said first sub-constellation of symbols, and
determining a smallest second distance between said symbol of said first set of symbols and said second sub-constellation of symbols.

15. The method as defined in claim 14, wherein said determining the reliability information comprises using at least said smallest first distance and said second smallest distance for determining said reliability information.

16. The method as defined in claim 10, further comprising determining probability information per bit 17. The method as defined in claim 16, further comprising determining log-likelihood probabilities per bit 18. The method as defined in claim 10, wherein the determining comprises determining the reliability of information, in which reliability information relating to said signal is taken into account in estimating the at least one symbol of the second set of symbols.

19. A method, comprising:
receiving a first set of symbols representing a signal received at a receiver; and
estimating a second set of symbols representing said signal transmitted at a transmitter using a sphere decoding technique, wherein reliability information relating to bits forming a symbol of the second set of symbols is taken into account in estimating at least one symbol of the second set of symbols, wherein
the reliability information defines a symbol constellation relationship between a plurality of the second set of symbols and a plurality of bit sequences,
a first sub-constellation of the second set of symbols relates to a given bit of the bit sequence having a value of 1, and
a second sub-constellation of the second set of symbols relates to a given bit of the bit sequence having a value of 0.

20. The method as defined in claim 19 further comprising receiving said reliability information relating to said signal.

21. The method as defined in claim 19, further comprising determining the reliability information relating to said signal for a first symbol of said second set of symbols based on at least a second symbol of said second set of symbols.

22. The method as defined in claim 19 wherein said estimating said second set of symbols comprises modifying candidate symbols based on at least said reliability information.

23. The method as defined in claim 22 wherein said modifying the candidate symbols comprises modifying the candidate symbols that belong to a search region defined for estimating a symbol of said second set of symbols.

24. The method as defined in claim 19, wherein said estimating said second set of symbols step comprises modifying a symbol of said first set of symbols based on at least said reliability information.

25. The method as defined in claim 24, wherein said modifying comprises weighting.

26. The method as defined in claim 19, wherein said receiving reliability information comprising receiving said reliability information which comprises a priori bit probabilities.

27. The method as defined in claim 19, wherein said estimating said second set of symbols comprises determining bit probabilities for a symbol of said second set of symbols given a respective symbol of said first set of symbols.

28. The method as defined in claim 19, further comprising representing the first set of symbols using a linear transformation of the second set of symbols.

29. The method as defined in claim 28, wherein said representing said linear transformation step comprising relating to channels of a multiple-input-multiple-output system, in which each symbol of said second set of symbols represents a symbol transmitted by an antenna of the multiple-input-multiple-output system.

30. The method as defined in claim 28, wherein said representing said linear transformation step comprises relating to multiple paths in a time division system, in which said second set of symbols represents sequential symbols of a user of the time division system.

31. The method as defined in claim 28, wherein said representing said linear transformation step comprising relating to different codes of a code division system, in which each symbol of said second set of symbols relates to a different code.

32. A method, method, comprising:
receiving a first set of symbols representing a signal received at a receiver; and estimating a second set of symbols representing said signal transmitted at a transmitter using a sphere decoding technique, wherein reliability information relating to said signal is taken into account in estimating at least one symbol of the second set of symbols, wherein
said estimating said second set of symbols comprises determining averaged probabilities of a priori bit probabilities comprised in said reliability information and bit probabilities given symbols of said first set of symbols.

33. An apparatus, comprising:
a receiver configured to receive a first set of symbols representing a signal received at a receiver antenna; and
an estimator configured to estimate a second set of symbols representing said signal transmitted at a transmitter using a sphere decoding technique, wherein
said estimator is configured to define a vector and each vector value of the vector contains a modulation scheme, and to concurrently employ at least two modulation schemes in estimating said second set of symbols.

34. The apparatus as defined in claim 33, wherein the estimator is configured to determine reliability information relating to bits forming a symbol for at least one symbol of said second set of symbols.

35. The apparatus as defined in claim 33, wherein the estimator is configured to take into account reliability information relating to said signal in estimating at least one symbol of the second set.

36. The apparatus as defined in claim 33, wherein the estimator is configured to take into account reliability information relating to said signal in estimating at least one symbol of the second set.

37. The apparatus as defined in claim 33, further comprising a receiver block.

38. The apparatus as defined in claim 33, further comprising a communications device.

39. The apparatus as defined in claim 33, further comprising a network element for a communications system.

40. An apparatus, comprising:
a receiver configured to receive a first set of symbols representing a signal received at a receiver antenna;
an estimator configured to estimate a second set of symbols representing said signal transmitted at a transmitter using a sphere decoding technique; and
a determiner configured to
determine a symbol constellation defining a relationship between a plurality of the second set of symbols and a plurality of bit sequences,
determine a first sub-constellation of the second set of symbols relating to a given bit of a bit sequence having a value of 1,
determine a second sub-constellation of the second set of symbols relating to said given bit of a bit sequence having a value of 0, and
determine reliability information relating to bits forming a symbol for at least one symbol of said second set of symbols.

41. The apparatus as defined in claim 40, wherein the estimator is configured to take into account reliability information relating to said signal in estimating the at least one symbol of the second set of symbols.

42. The apparatus as defined in claim 40, further comprising a receiver block.

43. The apparatus as defined in claim 40, further comprising a communications device.

44. The apparatus as defined in claim 40, further comprising a network element for a communications system.

45. An apparatus as defined in claim 40, further comprising a network element for a communication system, wherein said apparatus is configured to estimate a second set of symbols by determining averaged probabilities of a priori bit probabilities comprised in said reliability information and bit probabilities given symbols of said first set of symbols.

46. An apparatus, comprising:
a receiver configured to receive a first set of symbols representing a signal received at a receiver antenna; and
an estimator configured to estimate a second set of symbols representing said signal transmitted at a transmitter using a sphere decoding technique, wherein reliability information relating to the bits forming a symbol of the second set of symbols is taken into account in estimating at least one symbol of the second set of symbols, wherein
the reliability information defines a symbol constellation relationship between a plurality of the second set of symbols and a plurality of bit sequences,
a first sub-constellation of the second set of symbols relates to a given bit of the bit sequence having a value of 1, and
a second sub-constellation of the second set of symbols relates to a given bit of the bit sequence having a value of 0.

47. The apparatus as defined in claim 46, further comprising a receiver block.

48. The apparatus as defined in claim 46, further comprising a communications device.

49. The apparatus as defined in claim 46, further comprising a network element for a communications system.

50. A system, comprising:
a receiver configured to receive a first set of symbols representing a signal received at a receiver antenna; and
an estimator configured to estimate estimating means for estimating a second set of symbols representing said signal transmitted at a transmitter using a sphere decoding technique, wherein
the estimator is configured to define a vector and each vector value of the vector contains a modulation scheme, and to concurrently employs at least two modulation schemes.

51. A system, comprising:
receiver configured to receive a first set of symbols representing a signal received at a receiver antenna;
an estimator configured to estimate a second set of symbols representing said signal transmitted at a transmitter using a sphere decoding technique; and
a determiner configured to
determine a symbol constellation defining a relationship between a plurality of the second set of symbols and a plurality of bit sequences,
determine a first sub-constellation of the second set of symbols relating to a given bit of a bit sequence having a value of 1,
determine a second sub-constellation of the second set of symbols relating to said given bit of a bit sequence having a value of 0, and
determine reliability information relating to bits forming a symbol for at least one symbol of said second set of symbols.

52. A system, comprising:
a receiver configured to receive a first set of symbols representing a signal received at a receiver antenna; and
an estimator configured to estimate a second set of symbols representing said signal transmitted at a transmitter using a sphere decoding technique, wherein reliability information relating to the bits forming a symbol of the second set of symbols is taken into account in estimating at least one symbol of the second set of symbols, wherein the reliability information defines a symbol constellation relationship between a plurality of the second set of symbols and a plurality of bit sequences, a first sub-constellation of the second set of symbols relates to a given bit of the bit sequence having a value of 1, and a second sub-constellation of the second set of symbols relates to a given bit of the bit sequence having a value of 0.

53. An apparatus, comprising:

receiving means for receiving a first set of symbols representing a signal received at a receiver antenna; and estimating means for estimating a second set of symbols representing said signal transmitted at a transmitter using a sphere decoding technique, wherein said apparatus is configured to define a vector and each vector value of the vector contains a modulation scheme, and to concurrently employ at least two modulation schemes in estimating said second set of symbols.

54. An apparatus, comprising:

receiving means for receiving a first set of symbols representing a signal received at a receiver antenna;

estimating means for estimating a second set of symbols representing said signal transmitted at a transmitter using a sphere decoding technique; and determining means for determining constellation defining a relationship between a plurality of the second set of symbols and a plurality of bit sequences, determining a first sub-constellation of the second set of symbols relating to a given bit of a bit sequence having a value of 1, determining a second sub-constellation of the second set of symbols relating to said given bit of a bit sequence having a value of 0, and determining reliability information relating to bits forming a symbol for at least one symbol of said second set of symbols.

55. An apparatus, comprising:

receiving means for receiving a first set of symbols representing a signal received at a receiver antenna; and estimating means for estimating a second set of symbols representing said signal transmitted at a transmitter using a sphere decoding technique, wherein reliability information relating to the bits forming a symbol of the second set of symbols is taken into account in estimating at least one symbol of the second set of symbols, the reliability information defines a symbol constellation relationship between a plurality of the second set of symbols and a plurality of bit sequences, a first sub-constellation of the second set of symbols relates to a given bit of the bit sequence having a value of 1, and a second sub-constellation of the second set of symbols relates to a given bit of the bit sequence having a value of 0.

* * * * *